(12) United States Patent
Khlat

(10) Patent No.: US 10,566,843 B2
(45) Date of Patent: Feb. 18, 2020

(54) WIRELESS CHARGING CIRCUIT

(71) Applicant: QORVO US, INC., Greensboro, NC (US)

(72) Inventor: Nadim Khlat, Cugnaux (FR)

(73) Assignee: Qorvo US, Inc., Greensboro, NC (US)

( * ) Notice: Subject to any disclaimer, the term of this patent is extended or adjusted under 35 U.S.C. 154(b) by 204 days.

(21) Appl. No.: 14/792,912

(22) Filed: Jul. 7, 2015

(65) Prior Publication Data

US 2016/0020637 A1    Jan. 21, 2016

Related U.S. Application Data

(60) Provisional application No. 62/024,628, filed on Jul. 15, 2014.

(51) Int. Cl.
*H02J 50/20* (2016.01)
*H02J 7/02* (2016.01)
*H02J 7/04* (2006.01)

(52) U.S. Cl.
CPC .............. *H02J 50/20* (2016.02); *H02J 7/025* (2013.01); *H02J 7/027* (2013.01); *H02J 7/045* (2013.01)

(58) Field of Classification Search
CPC ................................. H02J 50/20; H02J 7/025
USPC .......................................... 320/108; 307/104
See application file for complete search history.

(56) References Cited

U.S. PATENT DOCUMENTS

| | | | |
|---|---|---|---|
| 2,447,234 A * | 8/1948 | Dean .................... | C07D 213/78 546/320 |
| 2,477,234 A | 8/1948 | Dean et al. | |
| 6,163,131 A * | 12/2000 | Gartstein ................ | H02M 3/00 320/118 |
| 6,172,608 B1 * | 1/2001 | Cole .................... | G06K 7/0008 340/10.4 |
| 6,184,651 B1 | 2/2001 | Fernandez et al. | |

(Continued)

FOREIGN PATENT DOCUMENTS

CN        103248138 A      8/2013

OTHER PUBLICATIONS

Examiner search report for U.S. Appl. No. 14/702,933 dated Sep. 24, 2019.*

(Continued)

*Primary Examiner* — Robert Grant
*Assistant Examiner* — John T Trischler
(74) *Attorney, Agent, or Firm* — Withrow & Terranova, P.L.L.C.

(57) ABSTRACT

A wireless charging circuit is disclosed. In this regard, a wireless charging circuit is configured to charge a battery by harvesting radio frequency (RF) power from a wireless RF charging signal provided by a wireless charging station. The wireless charging circuit monitors an effective charging power provided to the battery and sends a battery charging signal indication (BCSI) to the wireless charging station to reduce the effective charging power if the effective charging power is greater than a target charging power. In another aspect, the wireless charging circuit sends the BCSI to increase the effective charging power if the effective charging power is less than the target charging power. By dynamically adjusting the effective charging power based on the charging profile of the battery, it is possible to provide fast charging to the battery while protecting the battery from overcharging damage.

16 Claims, 12 Drawing Sheets

(56) References Cited

U.S. PATENT DOCUMENTS

| | | | |
|---|---|---|---|
| 6,415,186 B1 | 7/2002 | Chim et al. | |
| 7,167,044 B2* | 1/2007 | Li | H03F 1/0261 |
| | | | 220/253 |
| 7,366,480 B2* | 4/2008 | Amano | H04B 7/0805 |
| | | | 455/101 |
| 7,400,253 B2* | 7/2008 | Cohen | G06K 19/0707 |
| | | | 235/383 |
| 7,518,267 B2* | 4/2009 | Baarman | H01F 5/02 |
| | | | 307/150 |
| 7,521,890 B2* | 4/2009 | Lee | H02J 5/005 |
| | | | 320/108 |
| 7,750,851 B2* | 7/2010 | Washiro | H01Q 1/2225 |
| | | | 343/700 MS |
| 7,894,770 B2* | 2/2011 | Washiro | H04B 5/00 |
| | | | 455/41.1 |
| 8,013,795 B2* | 9/2011 | Washiro | H01Q 1/2225 |
| | | | 343/700 MS |
| 8,036,765 B2* | 10/2011 | Joly | G10L 25/69 |
| | | | 700/94 |
| 8,043,920 B2* | 10/2011 | Chan | H01L 29/66795 |
| | | | 257/347 |
| 8,115,448 B2* | 2/2012 | John | A61N 1/3785 |
| | | | 320/108 |
| 8,129,942 B2* | 3/2012 | Park | H02J 7/025 |
| | | | 320/108 |
| 8,238,824 B2* | 8/2012 | Washiro | H04B 5/00 |
| | | | 455/41.1 |
| 8,310,201 B1* | 11/2012 | Wright | G08C 17/02 |
| | | | 320/107 |
| 8,362,745 B2* | 1/2013 | Tinaphong | H02J 17/00 |
| | | | 320/101 |
| 8,410,544 B2* | 4/2013 | Chan | H01L 29/66795 |
| | | | 257/328 |
| 8,426,923 B2* | 4/2013 | Lee | H01L 21/823431 |
| | | | 257/365 |
| 8,447,234 B2* | 5/2013 | Cook | H04B 1/1607 |
| | | | 455/343.2 |
| 8,452,235 B2* | 5/2013 | Kirby | H02J 7/025 |
| | | | 455/41.1 |
| 8,463,332 B2* | 6/2013 | Sato | G06K 19/0702 |
| | | | 320/107 |
| 8,606,385 B2* | 12/2013 | Joly | G10L 25/69 |
| | | | 700/94 |
| 8,624,546 B2 | 1/2014 | Jung et al. | |
| 8,624,548 B2* | 1/2014 | Yamazaki | B60L 5/005 |
| | | | 320/108 |
| 8,660,271 B2* | 2/2014 | Wang | H04S 1/002 |
| | | | 381/17 |
| 8,682,261 B2* | 3/2014 | Ozaki | H02J 5/005 |
| | | | 455/82 |
| 8,712,467 B2* | 4/2014 | Clark | H04B 1/006 |
| | | | 455/552.1 |
| 8,716,974 B2* | 5/2014 | Sakoda | B60L 11/182 |
| | | | 320/108 |
| 8,803,474 B2* | 8/2014 | Hillan | G06K 7/0008 |
| | | | 320/108 |
| 8,811,901 B2* | 8/2014 | Shionoiri | H02J 17/00 |
| | | | 455/41.2 |
| 8,829,727 B2 | 9/2014 | Urano | |
| 8,895,383 B2* | 11/2014 | Lee | H01L 21/823431 |
| | | | 438/222 |
| 8,971,799 B2* | 3/2015 | Hamada | H02J 7/025 |
| | | | 455/41.1 |
| 8,983,374 B2* | 3/2015 | Wiley | H04B 5/0031 |
| | | | 455/41.1 |
| 9,002,044 B2* | 4/2015 | Dinescu | H04R 5/033 |
| | | | 381/309 |
| 9,077,388 B2* | 7/2015 | Kao | H04B 1/18 |
| 9,099,878 B2* | 8/2015 | Lee | H02J 17/00 |
| 9,123,467 B2* | 9/2015 | Wu | H01F 38/14 |
| 9,124,114 B2* | 9/2015 | Haruyama | H02J 5/005 |
| 9,124,121 B2* | 9/2015 | Ben-Shalom | H04B 5/0025 |
| 9,136,915 B2* | 9/2015 | Yoon | H04B 5/0062 |
| 9,153,969 B2* | 10/2015 | Kozakai | H02J 5/005 |
| 9,154,003 B2* | 10/2015 | Ichikawa | H04B 5/0087 |
| 9,192,501 B2* | 11/2015 | Fridez | A61F 5/0059 |
| 9,246,351 B2* | 1/2016 | Ozaki | H02J 5/005 |
| 9,269,489 B2* | 2/2016 | Wu | H01F 38/14 |
| 9,281,871 B2* | 3/2016 | Smith | H04B 5/0037 |
| 9,287,718 B2* | 3/2016 | Kari | H02J 5/005 |
| 9,325,080 B2* | 4/2016 | Ouyang | H01Q 21/30 |
| 9,337,539 B1* | 5/2016 | Ananthanarayanan | H01Q 5/335 |
| 9,338,784 B2* | 5/2016 | Clark | H04B 1/006 |
| 9,356,660 B2* | 5/2016 | Jung | H04B 5/0037 |
| 9,373,704 B2* | 6/2016 | Lee | H01L 21/823431 |
| 9,379,780 B2* | 6/2016 | Widmer | H04B 5/0037 |
| 9,391,468 B2* | 7/2016 | Takada | H02J 5/005 |
| 9,407,333 B2* | 8/2016 | Phillips | H04B 5/0037 |
| 9,408,015 B2* | 8/2016 | Khorram | H04B 1/16 |
| 9,413,191 B2* | 8/2016 | Kim | H02J 17/00 |
| 9,425,863 B2* | 8/2016 | Kim | H04B 5/0037 |
| 9,444,521 B2* | 9/2016 | Hamada | H02J 7/025 |
| 9,466,987 B2* | 10/2016 | Tamaki | H02J 5/005 |
| 9,467,008 B2* | 10/2016 | Sankar | H02J 17/00 |
| 9,577,460 B2* | 2/2017 | Park | H02J 7/025 |
| 9,590,428 B2 | 3/2017 | Kashiwagi et al. | |
| 9,608,454 B2* | 3/2017 | Sankar | H03H 7/40 |
| 9,620,996 B2* | 4/2017 | Zeine | H02J 50/80 |
| 9,621,230 B2* | 4/2017 | Ouyang | H04B 5/0081 |
| 9,632,554 B2* | 4/2017 | Zeine | H02J 50/80 |
| 9,653,942 B2* | 5/2017 | Kim | H02J 17/00 |
| 9,673,660 B2* | 6/2017 | Jung | H04B 5/0037 |
| 9,680,327 B2* | 6/2017 | Scheb | H02J 7/025 |
| 9,717,922 B2* | 8/2017 | Amir | A61N 1/3787 |
| 9,723,635 B2* | 8/2017 | Nambord | H04B 5/0031 |
| 9,755,460 B2* | 9/2017 | Shinoda | H04B 5/0012 |
| 9,761,370 B2* | 9/2017 | Wu | H01F 38/14 |
| 9,793,616 B2* | 10/2017 | Ouyang | H01Q 7/00 |
| 9,806,535 B2* | 10/2017 | Nakashima | H02M 1/4225 |
| 9,831,960 B2* | 11/2017 | Ghahramani | H04B 5/0031 |
| 9,837,848 B2* | 12/2017 | Fisher-Jeffes | H02J 17/00 |
| 9,857,821 B2* | 1/2018 | Kurs | G05F 1/625 |
| 9,859,957 B2* | 1/2018 | Shinohe | H01Q 1/2266 |
| 9,866,074 B2* | 1/2018 | Zeine | H02J 50/20 |
| 9,948,127 B2* | 4/2018 | Brink | H02J 7/025 |
| 9,985,462 B2* | 5/2018 | Bishtein | H02J 7/025 |
| 9,991,731 B2* | 6/2018 | Ichikawa | H02J 17/00 |
| 9,997,828 B2* | 6/2018 | Ouyang | H01Q 21/30 |
| 9,998,238 B2* | 6/2018 | Saada | H04B 1/1027 |
| 10,038,466 B2* | 7/2018 | Park | H04B 1/3888 |
| 10,050,474 B2* | 8/2018 | Ichikawa | H04B 5/0087 |
| 10,050,478 B2* | 8/2018 | Kim | H02J 17/00 |
| 10,123,156 B2* | 11/2018 | Butler | H04B 5/0012 |
| 10,135,259 B2* | 11/2018 | Smith | H04B 5/0037 |
| 10,148,001 B2* | 12/2018 | Han | H01Q 1/243 |
| 10,153,809 B2* | 12/2018 | Zhou | H04B 5/0037 |
| 10,177,817 B2* | 1/2019 | Ichikawa | H04B 5/0037 |
| 10,178,623 B2* | 1/2019 | Chae | H04B 1/02 |
| 10,193,376 B2* | 1/2019 | Mazooji | H02J 50/10 |
| 10,199,875 B2* | 2/2019 | Lee | H02J 7/025 |
| 10,224,759 B2* | 3/2019 | Khlat | H02J 50/20 |
| 10,264,528 B2* | 4/2019 | Kato | H02J 7/025 |
| 10,277,075 B2* | 4/2019 | Jung | H04B 5/0037 |
| 10,284,023 B2* | 5/2019 | Kim | H02J 17/00 |
| 10,291,066 B1* | 5/2019 | Leabman | H02J 7/025 |
| 10,291,294 B2* | 5/2019 | Leabman | H04B 5/0037 |
| 10,293,174 B2* | 5/2019 | Amir | A61N 1/3787 |
| 10,355,534 B2* | 7/2019 | Johnston | H02J 50/20 |
| 10,396,604 B2* | 8/2019 | Bell | H02J 50/80 |
| 10,404,107 B2* | 9/2019 | Ichikawa | H02J 7/025 |
| 2003/0085684 A1* | 5/2003 | Tsukamoto | A61N 1/3787 |
| | | | 320/108 |
| 2003/0134596 A1* | 7/2003 | Zhu | H04W 88/08 |
| | | | 455/41.1 |
| 2005/0085196 A1* | 4/2005 | Amano | H04B 7/0805 |
| | | | 455/101 |
| 2005/0143974 A1* | 6/2005 | Joly | G10L 25/69 |
| | | | 704/201 |
| 2005/0248402 A1* | 11/2005 | Zhenbiao | H03F 1/0261 |
| | | | 330/129 |

(56) References Cited

U.S. PATENT DOCUMENTS

| | | | |
|---|---|---|---|
| 2007/0145830 A1* | 6/2007 | Lee | H02J 5/005 307/135 |
| 2007/0178945 A1* | 8/2007 | Cook | H02J 17/00 455/572 |
| 2008/0058029 A1* | 3/2008 | Sato | G06K 19/0702 455/573 |
| 2008/0116847 A1* | 5/2008 | Loke | H02J 7/025 320/108 |
| 2008/0117117 A1* | 5/2008 | Washiro | H01Q 1/2225 343/850 |
| 2008/0153416 A1* | 6/2008 | Washiro | H04B 5/00 455/41.1 |
| 2008/0186129 A1* | 8/2008 | Fitzgibbon | H02J 17/00 340/5.2 |
| 2008/0211455 A1 | 9/2008 | Park et al. | |
| 2008/0233890 A1* | 9/2008 | Baker | H03L 7/085 455/73 |
| 2009/0001930 A1* | 1/2009 | Pohjonen | H01Q 1/2225 320/108 |
| 2009/0033293 A1* | 2/2009 | Xing | H02J 7/0077 320/164 |
| 2009/0233642 A1* | 9/2009 | Zhitnitsky | H04B 1/406 455/552.1 |
| 2009/0284227 A1* | 11/2009 | Mohammadian | G06K 7/0008 320/137 |
| 2010/0048126 A1* | 2/2010 | Nishiyama | H04W 76/28 455/41.1 |
| 2010/0090656 A1* | 4/2010 | Shearer | G06K 19/0707 320/139 |
| 2010/0142423 A1* | 6/2010 | Zhu | G08C 17/02 370/311 |
| 2010/0210207 A1* | 8/2010 | Goto | G06K 7/0008 455/41.1 |
| 2010/0222010 A1* | 9/2010 | Ozaki | H02J 5/005 455/77 |
| 2010/0225271 A1* | 9/2010 | Oyobe | B60L 53/12 320/108 |
| 2010/0233958 A1* | 9/2010 | Washiro | H01Q 1/2225 455/41.1 |
| 2010/0244576 A1* | 9/2010 | Hillan | G06K 7/0008 307/104 |
| 2010/0311327 A1* | 12/2010 | Hamada | H02J 7/025 455/41.1 |
| 2011/0018358 A1* | 1/2011 | Kozakai | H02J 7/025 307/104 |
| 2011/0050166 A1* | 3/2011 | Cook | H02J 17/00 320/108 |
| 2011/0062518 A1* | 3/2011 | Chan | H01L 29/66795 257/347 |
| 2011/0109263 A1* | 5/2011 | Sakoda | B60L 11/182 320/108 |
| 2011/0110404 A1* | 5/2011 | Washiro | H04B 5/00 375/219 |
| 2011/0115303 A1* | 5/2011 | Baarman | H02J 17/00 307/104 |
| 2011/0127610 A1* | 6/2011 | Lee | H01L 21/823431 257/365 |
| 2011/0169338 A1* | 7/2011 | Kozakai | H02J 5/005 307/104 |
| 2011/0175461 A1* | 7/2011 | Tinaphong | H02J 17/00 307/149 |
| 2011/0217927 A1* | 9/2011 | Ben-Shalom | H04B 5/0025 455/41.1 |
| 2011/0260548 A1* | 10/2011 | Urano | H02J 5/005 307/104 |
| 2011/0269502 A1* | 11/2011 | Clark | H04B 1/006 455/552.1 |
| 2011/0270025 A1* | 11/2011 | Fridez | A61F 5/0059 600/37 |
| 2011/0316081 A1* | 12/2011 | Chan | H01L 29/785 257/347 |
| 2011/0316475 A1* | 12/2011 | Jung | H04B 5/0037 320/108 |
| 2012/0025631 A1* | 2/2012 | Shionoiri | H02J 17/00 307/149 |
| 2012/0049294 A1* | 3/2012 | Chen | H01L 21/823431 257/401 |
| 2012/0056485 A1* | 3/2012 | Haruyama | H02J 5/005 307/104 |
| 2012/0099733 A1 | 4/2012 | Wang et al. | |
| 2012/0099734 A1 | 4/2012 | Joly | |
| 2012/0149301 A1* | 6/2012 | Wiley | H04B 5/0031 455/41.1 |
| 2012/0153894 A1 | 6/2012 | Widmer | |
| 2012/0177377 A1* | 7/2012 | Feldstein | H05K 9/0066 398/135 |
| 2012/0206096 A1* | 8/2012 | John | A61N 1/3785 320/108 |
| 2012/0230510 A1* | 9/2012 | Dinescu | H04R 5/033 381/80 |
| 2013/0058379 A1 | 3/2013 | Kim et al. | |
| 2013/0099733 A1* | 4/2013 | Park | H02J 7/0034 320/108 |
| 2013/0099734 A1* | 4/2013 | Lee | H02J 7/007 320/108 |
| 2013/0188397 A1* | 7/2013 | Wu | H01F 38/14 363/17 |
| 2013/0193913 A1* | 8/2013 | Takada | H02J 5/005 320/108 |
| 2013/0207468 A1* | 8/2013 | Wu | H01F 38/14 307/31 |
| 2013/0207601 A1* | 8/2013 | Wu | H01F 38/14 320/108 |
| 2013/0230958 A1* | 9/2013 | Lee | H01L 21/823431 438/283 |
| 2013/0300206 A1* | 11/2013 | Kim | H04B 5/0037 307/104 |
| 2014/0057559 A1* | 2/2014 | Smith | H04B 5/0037 455/41.1 |
| 2014/0073848 A1* | 3/2014 | Fridez | A61F 5/0059 600/37 |
| 2014/0084861 A1* | 3/2014 | Jung | H04B 5/0037 320/108 |
| 2014/0152117 A1 | 6/2014 | Sankar | |
| 2014/0152253 A1* | 6/2014 | Ozaki | H02J 5/005 320/108 |
| 2014/0159508 A1* | 6/2014 | Sankar | H02J 17/00 307/149 |
| 2014/0167523 A1 | 6/2014 | Tamaki et al. | |
| 2014/0210276 A1* | 7/2014 | Shinoda | H04B 5/0012 307/104 |
| 2014/0228072 A1* | 8/2014 | Clark | H04B 1/006 455/552.1 |
| 2014/0247004 A1 | 9/2014 | Kari et al. | |
| 2015/0051750 A1 | 2/2015 | Kurs et al. | |
| 2015/0054458 A1* | 2/2015 | Yoon | H02J 7/025 320/108 |
| 2015/0079753 A1* | 3/2015 | Lee | H01L 21/823431 438/283 |
| 2015/0084582 A1* | 3/2015 | Peterson | H02J 7/0055 320/107 |
| 2015/0115878 A1* | 4/2015 | Park | H02J 7/025 320/108 |
| 2015/0155738 A1* | 6/2015 | Leabman | H02J 7/025 307/29 |
| 2015/0171933 A1* | 6/2015 | Hamada | H02J 7/025 455/41.1 |
| 2015/0200547 A1* | 7/2015 | Nakashima | H02M 1/4225 307/104 |
| 2015/0249345 A1 | 9/2015 | Kashiwagi et al. | |
| 2015/0249360 A1* | 9/2015 | Ichikawa | H02J 17/00 320/108 |
| 2015/0280444 A1* | 10/2015 | Smith | H02J 17/00 307/104 |
| 2015/0318710 A1* | 11/2015 | Lee | H02J 307/104 |
| 2015/0372506 A1* | 12/2015 | Kozakai | H02J 5/005 307/104 |

(56) References Cited

U.S. PATENT DOCUMENTS

| | | | |
|---|---|---|---|
| 2015/0380973 A1* | 12/2015 | Scheb | H02J 7/025 320/108 |
| 2016/0006289 A1* | 1/2016 | Sever | H02J 7/025 320/108 |
| 2016/0020616 A1* | 1/2016 | Leabman | H02J 7/025 307/104 |
| 2016/0020636 A1* | 1/2016 | Khlat | H02J 7/025 320/108 |
| 2016/0020637 A1* | 1/2016 | Khlat | H02J 7/027 320/108 |
| 2016/0028268 A1 | 1/2016 | Fisher-Jeffes et al. | |
| 2016/0079799 A1* | 3/2016 | Khlat | H02J 7/025 320/108 |
| 2016/0087337 A1* | 3/2016 | Khlat | H01Q 3/267 320/108 |
| 2016/0087338 A1* | 3/2016 | Khlat | H01Q 3/267 320/108 |
| 2016/0087483 A1* | 3/2016 | Hietala | H02J 50/10 320/108 |
| 2016/0111894 A1* | 4/2016 | Bishtein | H02J 7/025 307/104 |
| 2016/0118844 A1* | 4/2016 | Park | H02J 7/0034 320/108 |
| 2016/0127011 A1* | 5/2016 | Phillips | H04B 5/0037 455/41.1 |
| 2016/0141890 A1* | 5/2016 | Smith | H04B 5/0037 307/104 |
| 2016/0164617 A1* | 6/2016 | Ghahramani | H04B 5/0031 455/41.1 |
| 2016/0175600 A1 | 6/2016 | Amir et al. | |
| 2016/0248272 A1* | 8/2016 | Jung | H04B 5/0037 |
| 2016/0301259 A1* | 10/2016 | Zeine | H02J 50/80 |
| 2017/0018946 A1* | 1/2017 | Brink | H02J 7/025 |
| 2017/0047776 A1 | 2/2017 | Scheibe | |
| 2017/0093170 A1* | 3/2017 | Saunamaki | H02J 50/60 |
| 2017/0141605 A1* | 5/2017 | Lee | H02J 7/025 |
| 2017/0141620 A1* | 5/2017 | Zeine | H02J 50/20 |
| 2017/0141621 A1* | 5/2017 | Zeine | H02J 50/20 |
| 2017/0170665 A9* | 6/2017 | Leabman | H02J 7/025 |
| 2017/0187249 A1* | 6/2017 | Zeine | H02J 50/80 |
| 2017/0217325 A1 | 8/2017 | DeBaun et al. | |
| 2017/0222484 A1 | 8/2017 | DeBaun et al. | |
| 2017/0266454 A1* | 9/2017 | Amir | A61N 1/3787 |
| 2017/0317529 A1 | 11/2017 | Smith et al. | |
| 2017/0324484 A1* | 11/2017 | Saada | H04B 1/1027 |
| 2017/0338683 A1* | 11/2017 | Jung | H04B 5/0037 |
| 2018/0101188 A1* | 4/2018 | Kurs | G05F 1/625 |
| 2018/0248417 A1* | 8/2018 | Ichikawa | H02J 17/00 |

OTHER PUBLICATIONS

U.S. Appl. No. 14/792,891, filed Jul. 7, 2015.
U.S. Appl. No. 14/792,933, filed Jul. 7, 2015.
Author Unknown, "Charging Lithium-ion Batteries," Battery University, CADEX, 2014, Date Accessed: Sep. 3, 2014, 4 pages, http://batteryuniversity.com/learn/article/charging_lithium_ion_batteries.
Non-Final Office Action for U.S. Appl. No. 14/792,891, dated Apr. 21, 2017, 18 pages.
Final Office Action for U.S. Appl. No. 14/792,891, dated Sep. 22, 2017, 22 pages.
Non-Final Office Action for U.S. Appl. No. 14/792,891, dated Jan. 25, 2018, 23 pages.
Non-Final Office Action for U.S. Appl. No. 14/792,933, dated May 19, 2017, 24 pages.
Final Office Action for U.S. Appl. No. 14/792,933, dated Nov. 29, 2017, 25 pages.
Non-Final Office Action for U.S. Appl. No. 14/792,933, dated Apr. 4, 2018, 18 pages.
Corrected Notice of Allowability for U.S. Appl. No. 14/792,891, dated Oct. 4, 2018, 4 pages.
Corrected Notice of Allowability for U.S. Appl. No. 14/792,891, dated Nov. 13, 2018, 4 pages.
Final Office Action for U.S. Appl. No. 14/792,933, dated Oct. 4, 2018, 22 pages.
Notice of Allowance for U.S. Appl. No. 14/792,891, dated Jul. 30, 2018, 10 pages.
Advisory Action for U.S. Appl. No. 14/792,933, dated Jan. 10, 2019, 3 pages.
Non-Final Office Action for U.S. Appl. No. 14/792,933, dated Feb. 21, 2019, 20 pages.
Final Office Action for U.S. Appl. No. 14/792,933, dated Jun. 13, 2019, 22 pages.
Applicant-Initiated Interview Summary for U.S. Appl. No. 14/792,933, dated Aug. 7, 2019, 3 pages.
Advisory Action for U.S. Appl. No. 14/792,933, dated Sep. 6, 2019, 3 pages.
Notice of Allowance for U.S. Appl. No. 14/792,933, dated Sep. 24, 2019, 9 pages.

* cited by examiner

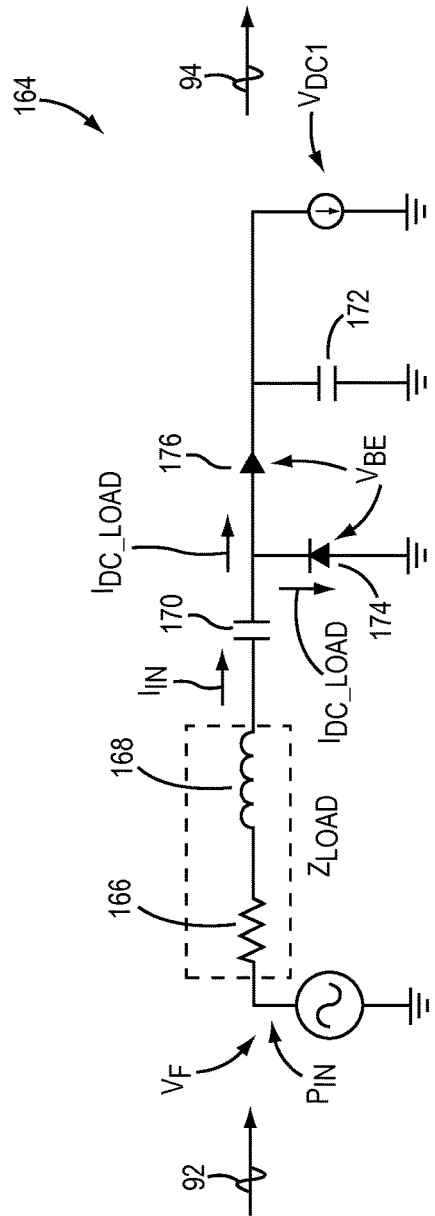
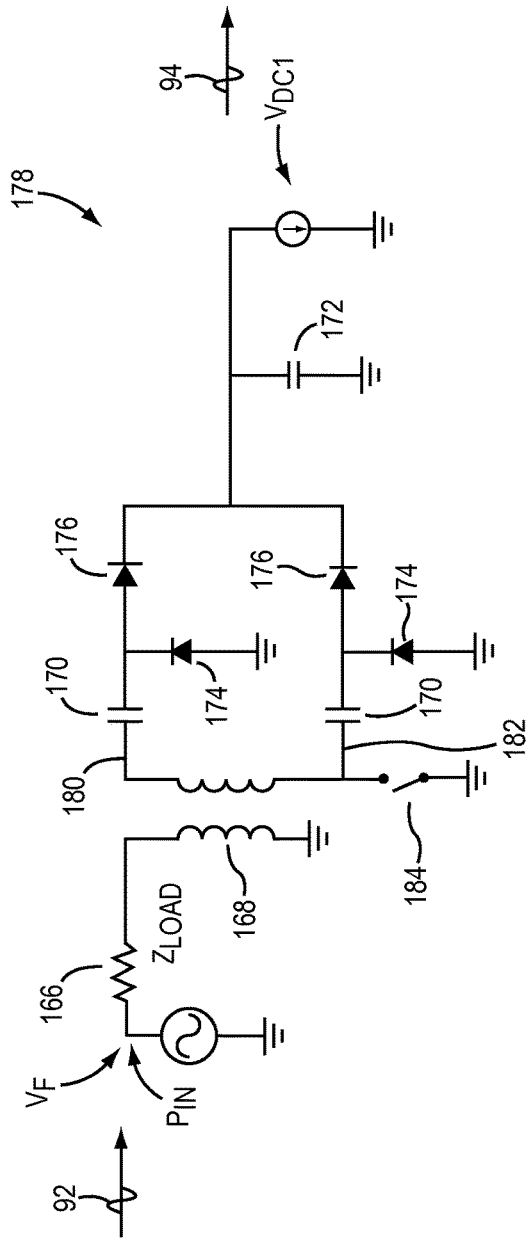
FIG. 10A
FIG. 10B

WIRELESS CHARGING CIRCUIT

RELATED APPLICATIONS

This application claims the benefit of U.S. provisional patent application Nos. 62/024,621, filed Jul. 15, 2014; 62/024,628, filed Jul. 15, 2014; 62/051,023, filed Sep. 16, 2014; 62/052,517, filed Sep. 19, 2014; 62/053,845, filed Sep. 23, 2014; and 62/052,822, filed Sep. 19, 2014, which are incorporated herein by reference in their entireties.

FIELD OF THE DISCLOSURE

The technology of the disclosure relates generally to wireless charging of a battery.

BACKGROUND

Mobile communication devices have become increasingly common in current society. The prevalence of these mobile communication devices is driven in part by the many functions that are now enabled on such devices. Demand for such functions increases the processing capability requirements for the mobile communication devices. As a result, increasingly complex integrated circuits (ICs) have been designed and manufactured to provide increasingly greater functionality in the mobile communication devices. However, the increasingly complex ICs also tend to consume more battery power during operation.

It has become more challenging to prolong battery life of the mobile communication devices in the face of continuing demand for higher processing speed, richer multimedia experience, and constant connectivity. As a result, the mobile communication devices are increasingly equipped with high-capacity batteries that are both expensive and space consuming. Even with the high-capacity batteries, the mobile communication devices often need to be plugged into the wall for recharging before the day is over.

SUMMARY

Aspects disclosed in the detailed description include a wireless charging circuit. In this regard, a wireless charging circuit is configured to charge a battery, for example, a lithium-ion (Li-ion) battery, by harvesting radio frequency (RF) power from a wireless RF charging signal provided by a wireless charging station. The wireless charging circuit monitors an effective charging power provided to the battery and compares the effective charging power against a target charging power determined according to a battery charging profile. In one aspect, the wireless charging circuit sends a battery charging signal indication (BCSI) to the wireless charging station to reduce the effective charging power if the effective charging power is greater than the target charging power. In another aspect, the wireless charging circuit sends the BCSI to the wireless charging station to increase the effective charging power if the effective charging power is less than the target charging power. By dynamically adjusting the effective charging power based on the charging profile of the battery, it is possible to provide fast charging to the battery while protecting the battery from overcharging damage.

In this regard, in one aspect, a wireless charging circuit is provided. The wireless charging circuit comprises an RF power harvesting circuit configured to receive a wireless RF charging signal from a wireless charging station and generate a direct-current (DC) charging signal to charge a battery. The wireless charging circuit also comprises a wireless charging controller. The wireless charging controller is configured to compare an effective charging power in the DC charging signal against a target charging power required by the battery. The wireless charging controller is also configured to provide a BCSI to the wireless charging station to reduce the effective charging power if the effective charging power is greater than the target charging power. The wireless charging controller is also configured to provide the BCSI to the wireless charging station to increase the effective charging power if the effective charging power is less than the target charging power.

Those skilled in the art will appreciate the scope of the disclosure and realize additional aspects thereof after reading the following detailed description in association with the accompanying drawings.

BRIEF DESCRIPTION OF THE DRAWINGS

The accompanying drawings incorporated in and forming a part of this specification illustrate several aspects of the disclosure and, together with the description, serve to explain the principles of the disclosure.

FIG. 10A is a schematic diagram of an exemplary single-stage rectifier that may be provided in the RF power harvesting circuit of FIG. 4; and FIG. 10B is a schematic diagram of an exemplary differential single-stage rectifier that may be provided in the RF power harvesting circuit of FIG. 4.

DETAILED DESCRIPTION

The embodiments set forth below represent the necessary information to enable those skilled in the art to practice the disclosure and illustrate the best mode of practicing the disclosure. Upon reading the following description in light of the accompanying drawings, those skilled in the art will understand the concepts of the disclosure and will recognize applications of these concepts not particularly addressed herein. It should be understood that these concepts and applications fall within the scope of the disclosure and the accompanying claims.

Aspects disclosed in the detailed description include a wireless charging circuit. In this regard, a wireless charging circuit is configured to charge a battery, for example, a lithium-ion (Li-ion) battery, by harvesting radio frequency (RF) power from a wireless RF charging signal provided by a wireless charging station. The wireless charging circuit monitors an effective charging power provided to the battery and compares the effective charging power against a target charging power determined according to a battery charging profile. In one aspect, the wireless charging circuit sends a battery charging signal indication (BCSI) to the wireless charging station to reduce the effective charging power if the effective charging power is greater than the target charging power. In another aspect, the wireless charging circuit sends the BCSI to the wireless charging station to increase the effective charging power if the effective charging power is less than the target charging power. By dynamically adjusting the effective charging power based on the charging profile of the battery, it is possible to provide fast charging to the battery while protecting the battery from overcharging damage.

Figure 1A:
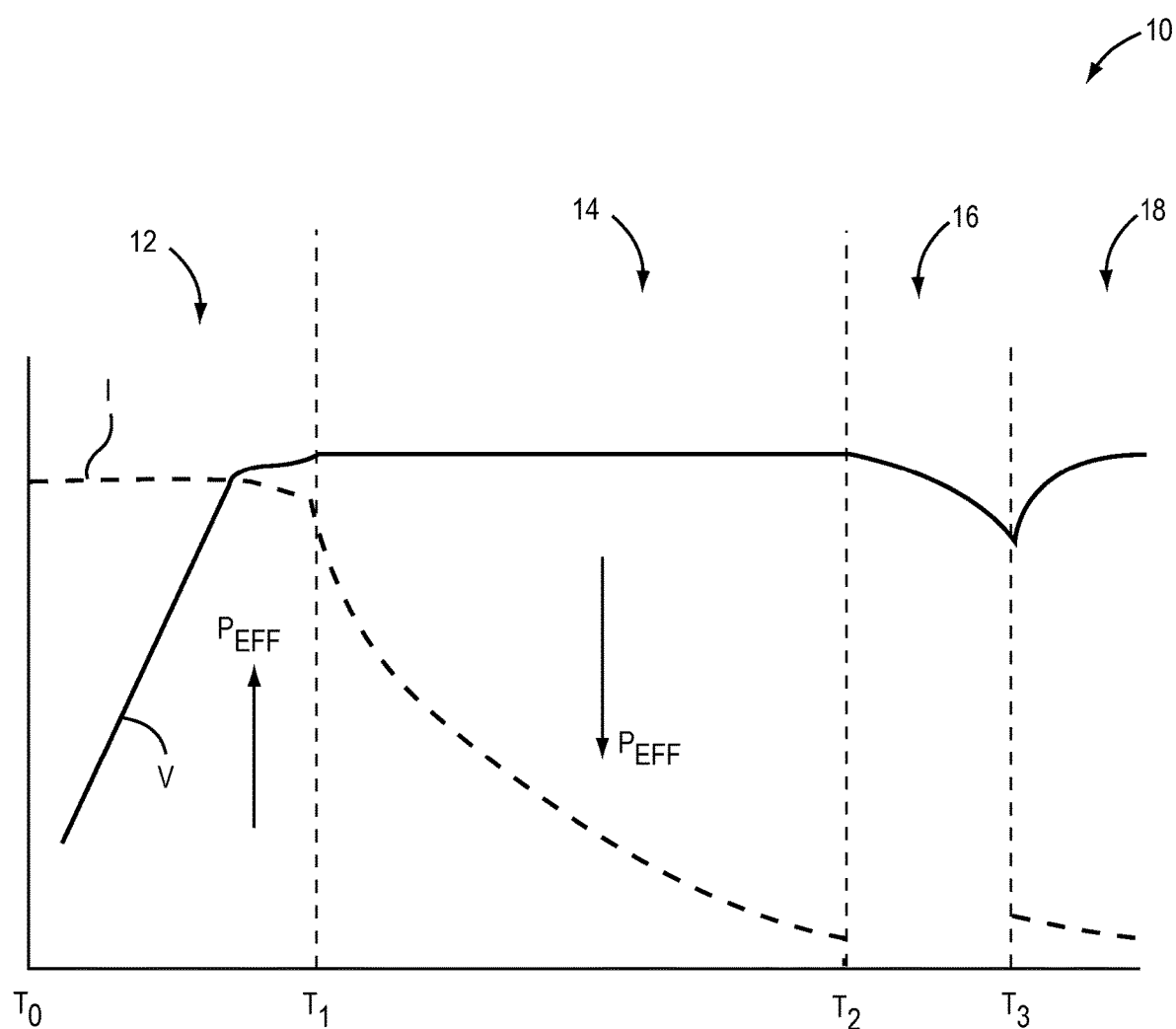
FIG. 1A is an exemplary illustration of a lithium-ion (Li-ion) battery charging profile.
Figure 1B:
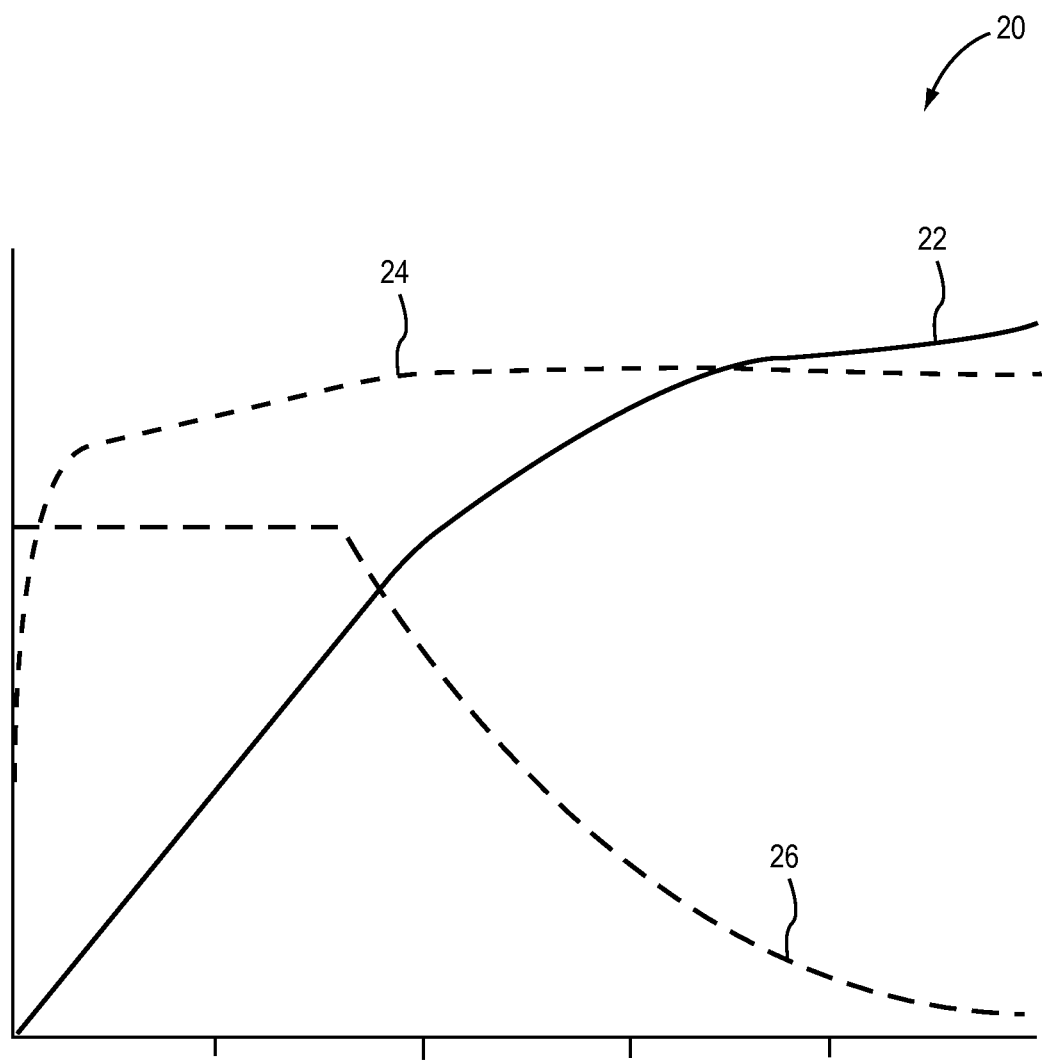
FIG. 1B is a capacity-voltage curve providing an exemplary illustration of Li-ion battery capacity as a function of a charging voltage and a charging current.

Before discussing the wireless charging concepts of the present disclosure, a brief overview of a Li-ion battery charging profile is provided with references to FIGS. 1A and 1B. The discussion of specific exemplary aspects of wireless charging starts below with reference to FIG. 2.

In this regard, FIG. 1A is an exemplary illustration of a Li-ion battery charging profile 10. As is well known in the industry, a Li-ion battery (not shown) has strict requirements on charging voltage and charging current because Li-ion cells (not shown) in the Li-ion battery cannot accept overcharge. In this regard, the Li-ion battery can only take what it can absorb. Anything extra can cause stress and even permanent damage to the Li-ion battery.

When the Li-ion battery is connected to a charging source (not shown) at time $T_0$, the Li-ion battery is in a constant current stage 12, wherein charging voltage (referenced in drawings as V) rises while charging current (referenced in drawings as I) remains constant. As such, an effective charging power (referenced in drawings as $P_{EFF}$) ($P_{EFF}=V\times I$) increases as a result of the charging voltage increase, thus enabling fast charging of the Li-ion battery. At time $T_1$, the Li-ion battery is in a saturation charge stage 14, wherein the charge voltage peaks and levels off while the charge current starts to decline. As such, the effective charging power decreases as a result of the charging current decline. At time $T_2$, the Li-ion battery is in a ready stage 16, wherein the Li-ion is charged to a desired voltage level and the charging current drops to zero (0). In this regard, the effective charging power also drops to zero (0) to prevent overcharging damage to the Li-ion battery. At time $T_3$, the Li-ion battery is in a standby stage 18, wherein the charge current may be applied occasionally to top the Li-ion battery up to the desired voltage level.

FIG. 1B is a capacity-voltage curve 20 providing an exemplary illustration of a Li-ion battery capacity as a function of the charging voltage and the charging current of FIG. 1A. The capacity-voltage curve 20 comprises a capacity curve 22, a charging voltage curve 24, and a charging current curve 26. When the Li-ion battery is connected to the charging source, the charging voltage curve 24 shoots up quickly. In this regard, the Li-ion battery is in the constant current stage 12 according to the Li-ion battery charging profile 10 of FIG. 1A. As the capacity curve 22 gradually peaks, the charging current curve 26 declines quickly and the charging voltage curve 24 levels off. In this regard, the Li-ion battery is in the saturation charge stage 14 according to the Li-ion battery charging profile 10. Since the Li-ion battery cannot accept overcharge, the charging current must be cut off. A continuous trickle charge (maintenance charge) would cause plating of metallic lithium, thus compromising safety of the Li-ion battery. Hence, according to the Li-ion battery charging profile 10 and the capacity-voltage curve 20, the effective charging power increases when the Li-ion battery is in the constant current stage 12 and decreases when the Li-ion battery is in the saturation charge stage 14 to ensure fast charging and protect the Li-ion battery from overcharging damage.

The Li-ion battery has become increasingly popular in battery-operated electronic devices, such as smartphones, tablets, and portable computers, due to many advantages over traditional batteries (e.g., nickel-cadmium batteries). For example, the Li-ion battery has higher power density, produces less self-discharge, and requires lower maintenance to prolong battery life than the traditional batteries. Concurrent to the prevalence of Li-ion battery technology, wireless charging is also gaining traction in the wireless communication industry and may one day replace charging plugs and wires, similar to how BLUETOOTH™ and wireless-fidelity (Wi-Fi) have eliminated communication cables (e.g., Ethernet cables) in peer-to-peer and peer-to-multi-peer communications.

Figure 2:
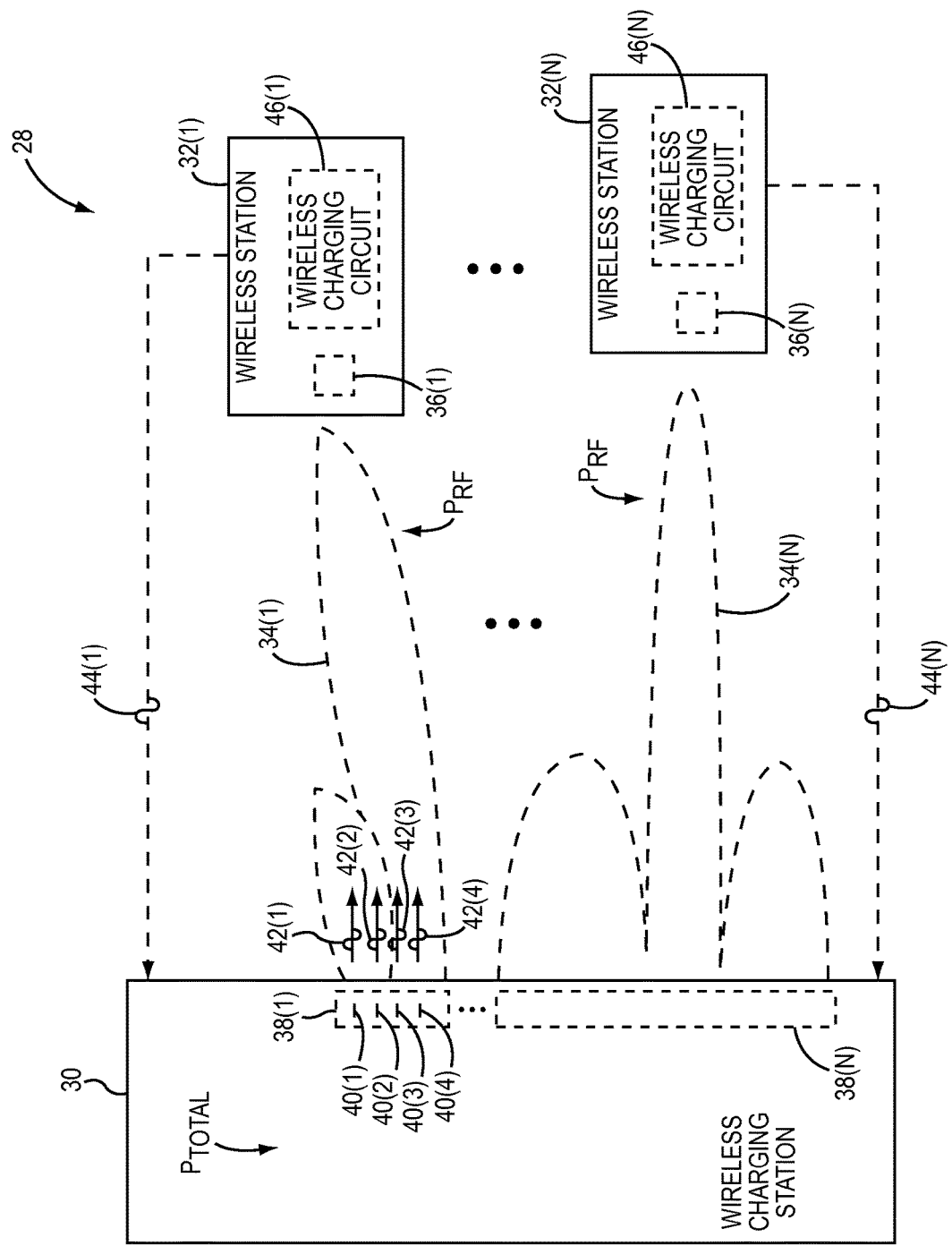
FIG. 2 is a schematic diagram of an exemplary wireless charging system, wherein a wireless charging station is configured to charge one or more wireless stations via one or more respective wireless radio frequency (RF) signals.

In this regard, FIG. 2 is a schematic diagram of an exemplary wireless charging system 28, wherein a wireless charging station 30 is configured to charge one or more wireless stations 32(1)-32(N) via one or more respective wireless RF charging signals 34(1)-34(N). The one or more wireless stations 32(1)-32(N) comprise one or more respective batteries 36(1)-36(N). In a non-limiting example, the one or more batteries 36(1)-36(N) are Li-ion batteries. In this regard, the Li-ion battery charging profile 10 of FIG. 1A and the capacity-voltage curve 20 of FIG. 1B are applicable when charging the one or more batteries 36(1)-36(N) in the wireless charging system 28. In another non-limiting example, the one or more wireless RF charging signals 34(1)-34(N) are provided on an industrial, scientific, and medical (ISM) band that may operate in nine hundred fifteen megahertz (915 MHz), twenty-four hundred megahertz (2400 MHz), fifty-eight hundred megahertz (5800 MHz), or twenty-four gigahertz (24 GHz) RF spectrums.

The wireless charging station 30 has a total available power (referenced in drawings as $P_{TOTAL}$), which must be set below a maximum power (not shown) that is set by regulatory authorities such as the Federal Communications Commission (FCC) in the United States. The total available power is shared among the one or more wireless stations 32(1)-32(N). The wireless charging station 30 dynamically determines how the total available power is distributed among the one or more wireless stations 32(1)-32(N). In this regard, the more wireless stations that are in the wireless charging system 28, the lesser share of the total available power each wireless station will receive.

With continuing reference to FIG. 2, the wireless charging station 30 comprises a plurality of antenna elements (not shown). In a non-limiting example, the wireless charging station 30 can have in excess of ten thousand (10,000) antenna elements. The plurality of antenna elements in the wireless charging station 30 may be further configured to form one or more antenna arrays 38(1)-38(N), wherein each of one or more antenna arrays 38(1)-38(N) comprises at least two antenna elements among the plurality of antenna elements of the wireless charging station 30. The one or more antenna arrays 38(1)-38(N) are configured to transmit the one more wireless RF charging signals 34(1)-34(N) to the one or more wireless stations 32(1)-32(N), respectively. To illustrate the configuration and operation of the wireless charging system 28, wireless station 32(1), wireless RF charging signal 34(1), and antenna array 38(1) are discussed as a non-limiting example. It should be understood that the configuration and operation discussed herein are applicable to the one or more antenna arrays 38(1)-38(N), the one or more wireless RF charging signals 34(1)-34(N), and the one or more wireless stations 32(1)-32(N) as well.

If, for example, the antenna array 38(1) comprises four antenna elements 40(1)-40(4), the wireless RF charging signal 34(1) will comprise four RF signals 42(1)-42(4) transmitted from the four antenna elements 40(1)-40(4), respectively. In this regard, the wireless RF charging signal 34(1) is a beamformed wireless RF charging signal. Beamforming is a modern wireless signal transmission scheme, wherein multiple wireless signals, such as the four RF signals 42(1)-42(4), are transmitted simultaneously toward a single wireless receiver. If phases of the multiple wireless signals are coherent, the wireless receiver will be able to linearly combine the multiple wireless signals for improved signal strength and power gain.

Since the four RF signals 42(1)-42(4) may arrive at the wireless station 32(1) through different paths, the four antenna elements 40(1)-40(4) in the antenna array 38(1) are calibrated to ensure phase coherence when the four RF signals 42(1)-42(4) arrive at the wireless station 32(1). By having the phase coherence among the four RF signals 42(1)-42(4), a total RF power (referenced in drawings as $P_{RF}$) of the wireless RF charging signal 34(1) can be linearly controlled by adjusting individual RF power of the four RF signals 42(1)-42(N). Hence, the total RF power of the wireless RF charging signal 34(1) can be maximized.

If the antenna array 38(1) and the wireless station 32(1) are disposed in a line-of-sight (LOS) arrangement, transmission phases and amplitudes of the four RF signals 42(1)-42(4) can be estimated based on a training signal (not shown) provided by the wireless station 32(1) under the assumption that the training signal would have a high degree of phase correlation with the wireless RF charging signal 34(1). However, this may not always be the case in the wireless charging system 28 because the antenna array 38(1) and the wireless station 32(1) may not always be disposed in the LOS arrangement. When the antenna array 38(1) and the wireless station 32(1) are not disposed in the LOS arrangement, the estimated transmission phases and amplitudes based on the training signal may be inaccurate. As a result, it may be more difficult to preserve phase coherence among the four RF signals 42(1)-42(4) and control the total RF power in the wireless RF charging signal 34(1). Consequently, it is also difficult for the wireless charging station 30 to control the effective charging power according to the Li-ion battery charging profile 10 of FIG. 1A since the effective charging power is proportionally related to the total RF power. In this regard, one or more battery charging signal indications (BCSIs) 44(1)-44(N) are provided by the one or more wireless stations 32(1)-32(N), respectively, to help control the effective charging power according to the Li-ion battery charging profile 10.

For example, BCSI 44(1) provided by the wireless station 32(1) indicates a difference between the effective charging power being provided to the battery 36(1) and a target charging power (referenced in drawings as $P_{TARGET}$) determined based on the Li-ion battery charging profile 10. In a non-limiting example, the BCSI 44(1) is set to zero (0) when the effective charging power is greater than the target charging power to request a decrease of the total RF power in the wireless RF charging signal 34(1). In another non-limiting example, the BCSI 44(1) is set to one (1) when the effective charging power is less than the target charging power to request an increase of the total RF power in the wireless RF charging signal 34(1). Upon receiving the BCSI 44(1), the wireless charging station 30 adjusts the individual RF power of the four RF signals 42(1)-42(4) accordingly. For example, the wireless charging station 30 can decrease the individual RF power of the four RF signals 42(1)-42(4) if the BCSI 44(1) is set to zero (0), or increase the individual RF power of the four RF signals 42(1)-42(4) when the BCSI 44(1) is set to one (1). Hence, by providing the BCSI 44(1) to the wireless charging station 30 continuously or according to a predefined feedback schedule, the effective charging power provided to the battery 36(1) can be gradually adjusted to eventually match the target charging power.

Figure 3A:
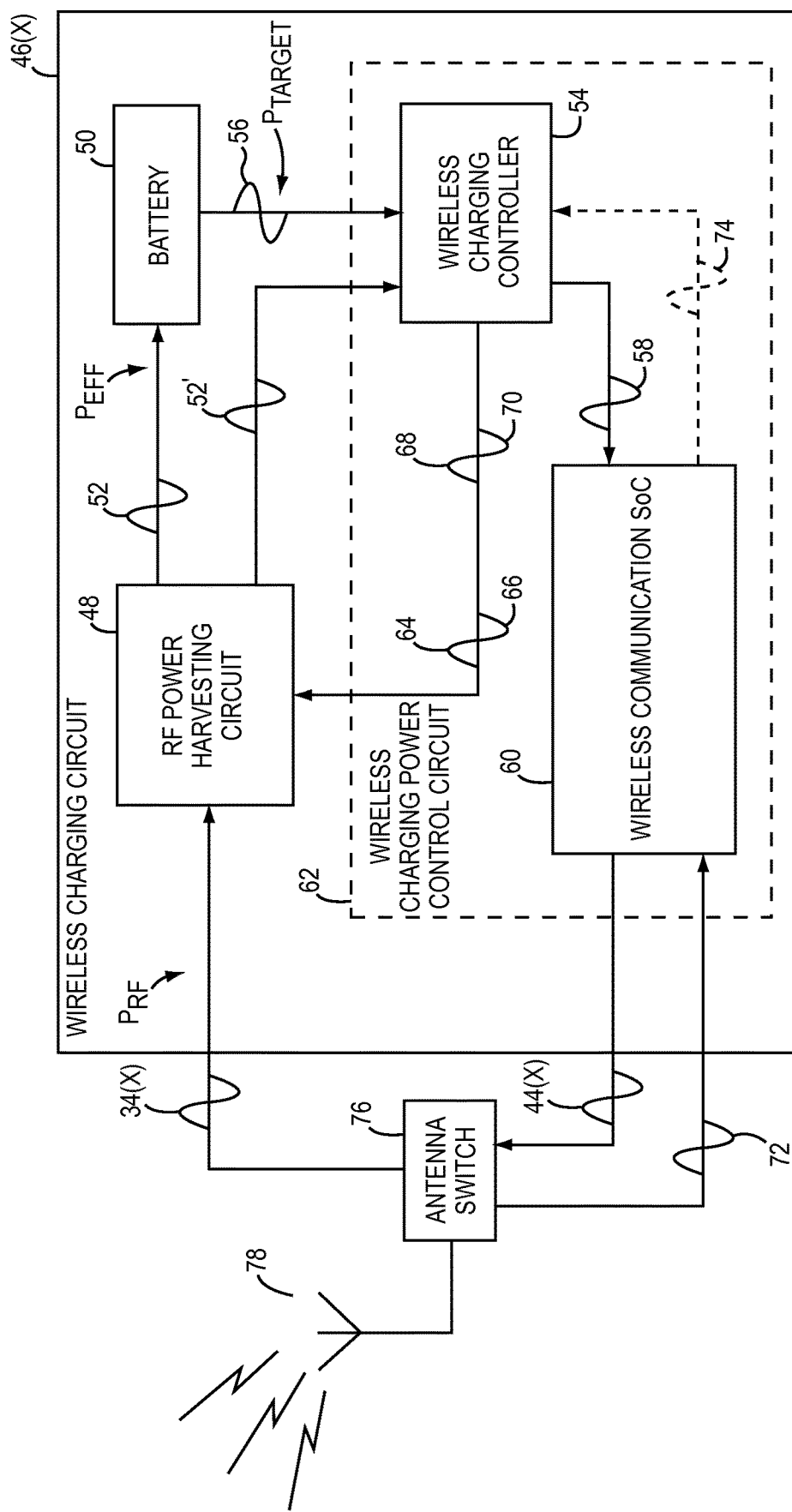
FIG. 3A is a schematic diagram of an exemplary wireless charging circuit configured to control an effective charging power provided to a battery by providing a battery charging signal indication (BCSI) to the wireless charging station of FIG. 2.

The one or more BCSIs 44(1)-44(N) are generated by one or more wireless charging circuits 46(1)-46(N) in the one or more wireless stations 32(1)-32(N), respectively. In this regard, FIG. 3A is a schematic diagram of an exemplary wireless charging circuit 46(X), which can be any of the one or more wireless charging circuits 46(1)-46(N) of FIG. 2, configured to control the effective charging power by providing a BCSI 44(X), from among the one or more BCSIs 44(1)-44(N), to the wireless charging station 30. Elements of FIG. 2 are referenced in connection with FIG. 3A and will not be re-described herein. In a non-limiting example, the wireless charging circuit 46(X) may be provided in a battery-operated electronic device, such as a smartphone, a smartwatch, a tablet, a personal computer, a digital camera, a portable music player, a portable video player, a portable game player, a video recorder, and so on.

Figure 4:
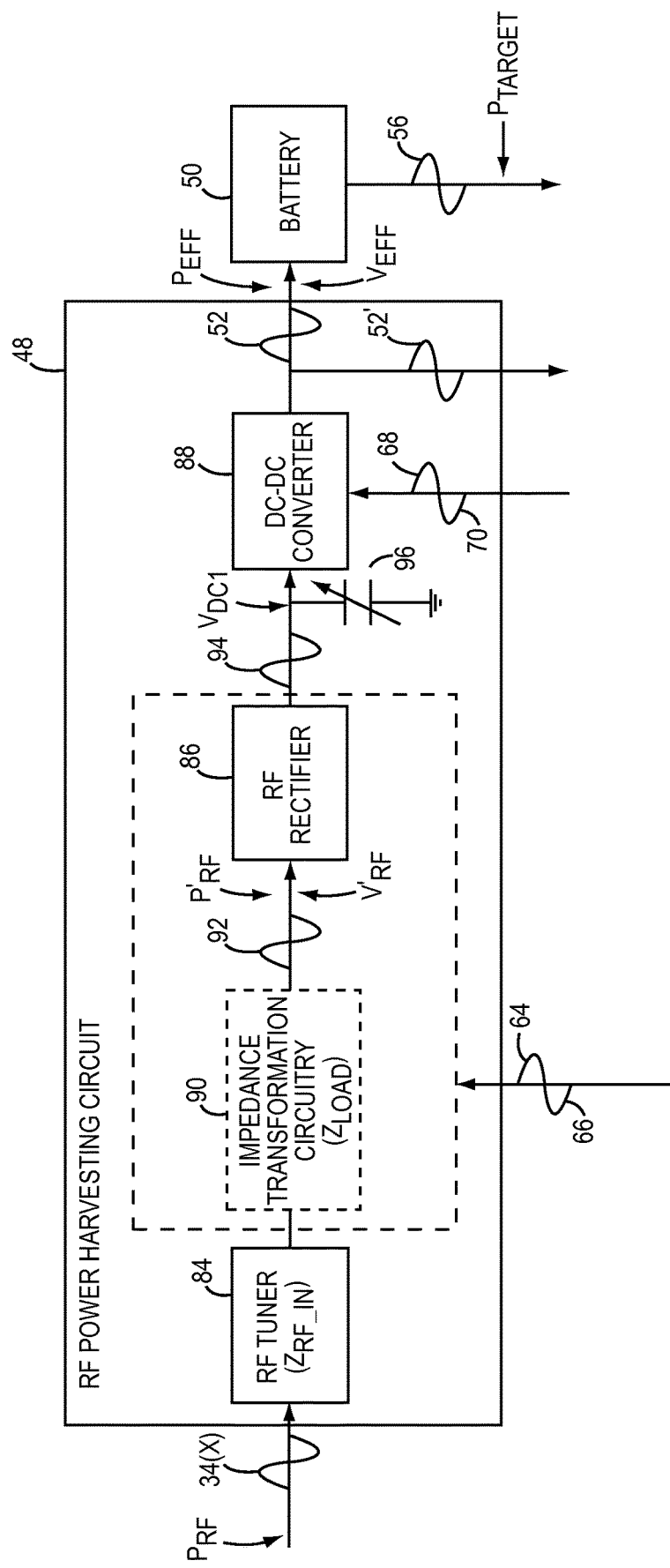
FIG. 4 is a schematic diagram of an exemplary RF power harvesting circuit configured to turn a wireless RF charging signal received from the wireless charging station of FIG. 2 into a direct-current (DC) charging signal to charge the battery of FIG. 3A.

With reference to FIG. 3A, the wireless charging circuit 46(X) comprises an RF power harvesting circuit 48 that is coupled to a battery 50. In a non-limiting example, the battery 50 is a Li-ion battery and thus, obeys the Li-ion battery charging profile 10 of FIG. 1A. The RF power harvesting circuit 48, which will be discussed later in FIG. 4, is configured to receive a wireless RF charging signal 34(X), which may be any of the one or more wireless RF charging signals 34(1)-34(N), and generate a DC charging signal 52 to charge the battery 50. The DC charging signal 52 is associated with an effective charging voltage (referenced in drawings as $V_{EFF}$) and an effective charging current that define the effective charging power. The effective charging power is proportionally related to the total RF power received in the wireless RF charging signal 34(X). Because the wireless charging station 30 must share the total available power among the one or more wireless stations 32(1)-32(N), the total RF power in the wireless RF charging signal 34(X) can vary from time to time.

The wireless charging circuit 46(X) also comprises a wireless charging controller 54 that is configured to generate the BCSI 44(X). The wireless charging controller 54 receives a copy of the DC charging signal 52', which indicates the effective charging power provided to the battery 50 by the RF power harvesting circuit 48. The wireless charging controller 54 also obtains a battery status reading 56 indicating the target charging power from the battery 50. The wireless charging controller 54 generates a BCSI feedback 58 based on a comparison between the effective charging power and the target charging power. In a non-limiting example, the BCSI feedback 58 is set to zero (0) if the effective charging power is greater than the target charging power. Conversely, the BCSI feedback 58 is set to one (1) if the effective charging power is less than the target charging power.

The BCSI feedback 58 is provided to a wireless communication system-on-chip (SoC) 60 wherein the BCSI feedback 58 is encoded into the BCSI 44(X). In a first non-limiting example, the wireless communication SoC 60 may also encode a received signal strength indicator (RSSI) of the wireless RF charging signal 34(X) in the BCSI 44(X). In a second non-limiting example, the wireless communication SoC 60 may be a BLUETOOTH SoC, a Wi-Fi SoC, a ZigBee SoC, or a BLUETOOTH Low-Energy (BLE) SoC. In a third non-limiting example, the wireless charging controller 54 and the wireless communication SoC 60 may be packaged into a wireless charging power control circuit 62. In a fourth non-limiting example, the wireless charging controller 54 may also be integrated into the wireless communication SoC 60.

With continuing reference to FIG. 3A, in addition to requesting an adjustment to the total RF power and consequently the effective charging power, by sending the BCSI 44(X) to the wireless charging station 30, it is also possible to adjust the effective charging power in the DC charging signal 52 by adjusting settings of the RF power harvesting circuit 48. In this regard, the wireless charging controller 54 may provide a first power decrease control signal 64, a first power increase control signal 66, a second power decrease control signal 68, and a second power increase control signal 70 to adjust different elements in the RF power harvesting circuit 48. More detailed descriptions regarding the adjustments to the RF power harvesting circuit 48 are provided later in FIG. 4.

The wireless communication SoC 60 may receive and decode a downlink signal 72 to generate a charging control signal 74. In a non-limiting example, the charging control signal 74 may comprise instructions from the wireless charging station 30 for adjusting the settings of the RF power harvesting circuit 48.

The wireless charging circuit 46(X) is coupled to an antenna switch 76, which is coupled to at least one antenna 78. In a non-limiting example, the at least one antenna 78 is capable of emitting RF signals on the 910 MHz, the 2400 MHz, the 5800 MHz, and the 24 GHz RF spectrums of the ISM band. The antenna switch 76 switches the at least one antenna 78 between receiving the wireless RF charging signal 34(X), transmitting the BCSI 44(X), and receiving the downlink signal 72 according to a time-division arrangement.

Figure 3B:
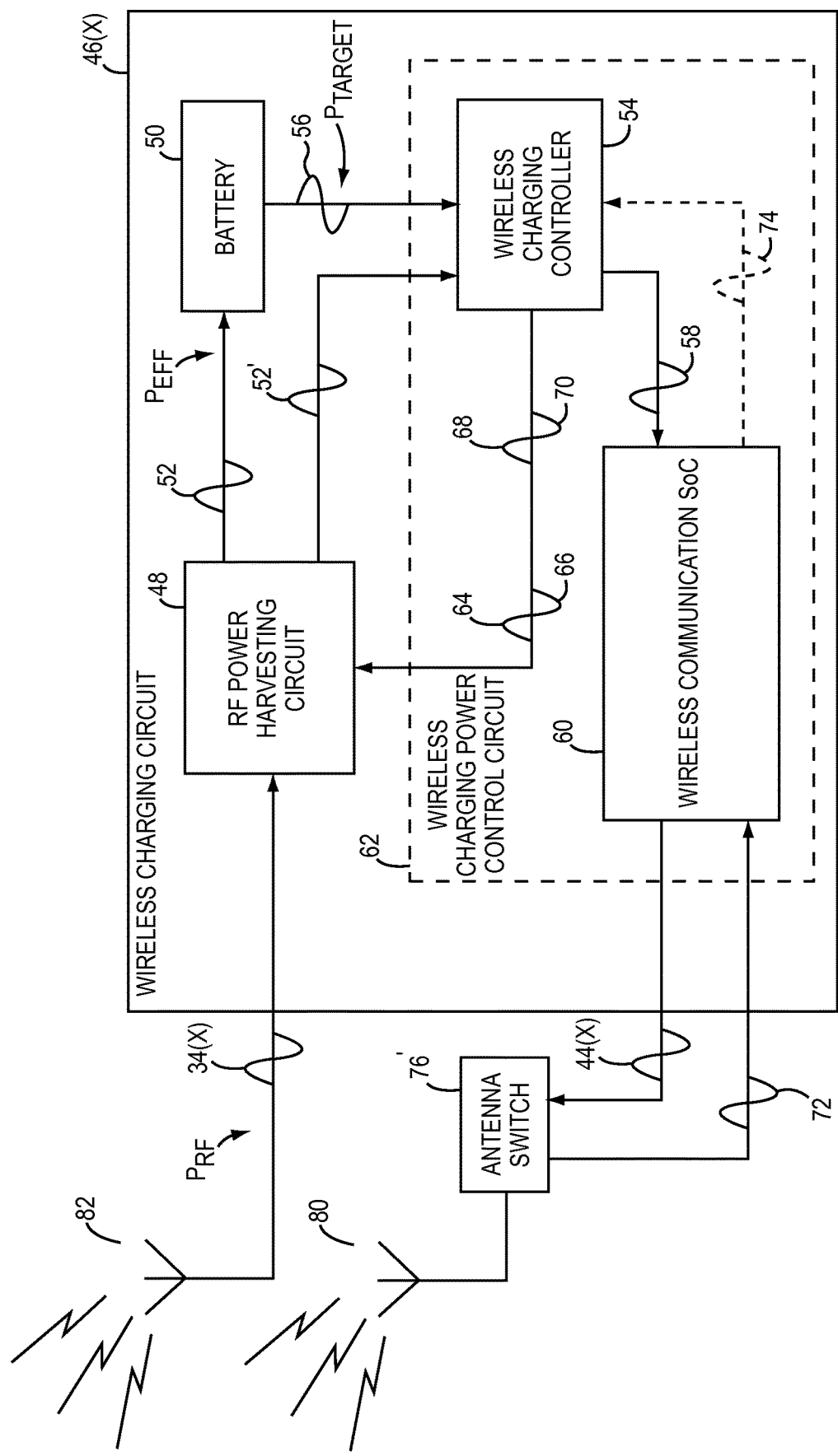
FIG. 3B is a schematic diagram of the exemplary wireless charging circuit of FIG. 3A that is coupled to a communication antenna and a wireless charging antenna.

In some cases, it may be desirable to have an antenna dedicated for receiving the wireless RF charging signal 34(X). In this regard, FIG. 3B is a schematic diagram of the exemplary wireless charging circuit 46(X) of FIG. 3A that is coupled to a communication antenna 80 and a wireless charging antenna 82. Common elements between FIGS. 3A and 3B are shown therein with common element numbers, and thus will not be re-described herein. By having the wireless charging antenna 82 dedicated to receiving the wireless RF charging signal 34(X), it is possible to use a simplified antenna switch 76' to reduce costs and complexity of a wireless station 32(X).

As previously discussed in FIG. 3A, the RF power harvesting circuit 48 is configured to turn the wireless RF charging signal 34(X) into the DC charging signal 52 to charge the battery 50. In this regard, FIG. 4 is a schematic diagram of the RF power harvesting circuit 48 of FIG. 3A configured to turn the wireless RF charging signal 34(X) into the DC charging signal 52 to charge the battery 50. Elements of FIG. 3A are referenced in connection with FIG. 4 and will not be re-described herein.

With reference to FIG. 4, the RF power harvesting circuit 48 comprises an RF tuner 84, an RF rectifier 86, and a DC-to-DC (DC-DC) converter 88. The RF tuner 84 has an input impedance (referenced in drawings as $Z_{RF\_IN}$). An impedance transformation circuitry 90 is provided in the RF power harvesting circuit 48 to provide a load-line impedance (referenced in drawings as $Z_{LOAD}$). In a non-limiting example, the impedance transformation circuitry 90 may be integrated with the RF rectifier 86. In another non-limiting example, the RF power harvesting circuit 48 may be integrated into an integrated circuit (IC).

The RF tuner 84 receives the wireless RF charging signal 34(X) from the wireless charging station 30 of FIG. 2. According to previous discussion in FIG. 3A, the wireless RF charging signal 34(X) carries the total RF power. The RF tuner 84 generates an alternating current (AC) charging signal 92 based on the wireless RF charging signal 34(X). The AC charging signal 92 has a respective RF power (referenced in drawings as $P'_{RF}$) and a respective voltage (referenced in drawings as $V'_{RF}$) that is influenced by the load-line impedance. The respective RF power in the AC charging signal 92 is maximized when the load-line impedance matches the input impedance. In contrast, when the load-line impedance mismatches the input impedance, the respective RF power in the AC charging signal 92 is less than the total RF power of the wireless RF charging signal 34(X) due to signal reflection. Further, if the load-line impedance is substantially higher than the input impedance, the respective voltage of the AC charging signal 92 is maximized, even though the respective RF power is less than the maximum power. As such, the load-line impedance may be manipulated to influence the efficiency of the RF rectifier 86, and thus controlling the effective charging power of the DC charging signal 52.

In this regard, when the wireless charging controller 54 (not shown) determines that the effective charging power is greater than the target charging power, the wireless charging controller 54 can provide the first power decrease control signal 64 to the impedance transformation circuitry 90 in addition to sending the BCSI 44(X) to the wireless charging station 30. The first power decrease control signal 64 causes the load-line impedance to mismatch the input impedance, thus reducing the respective RF power and, consequently, the effective charging power.

In contrast, if the wireless charging controller 54 determines that the effective charging power is less than the target charging power, the wireless charging controller 54 can provide the first power increase control signal 66 to the impedance transformation circuitry 90 in addition to sending the BCSI 44(X) to the wireless charging station 30. The first power increase control signal 66 causes the load-line impedance to be substantially higher than the input impedance, thus increasing the respective voltage applied to the RF rectifier 86 and thus, controlling the effective charging power.

The RF rectifier 86 receives and converts the AC charging signal 92 into a DC signal 94 having a first DC voltage (sometimes referred to as $V_{DC1}$). In a non-limiting example, the RF rectifier 86 may be a single-stage rectifier or a differential single-stage rectifier. The RF power harvesting circuit 48 also comprises a tunable capacitor 96 coupled between the RF rectifier 86 and the DC-DC converter 88, wherein the tunable capacitor 96 is configured to remove voltage fluctuations in the DC signal 94.

With continuing reference to FIG. 4, the DC-DC converter 88 is configured to up-convert the first DC voltage into a second DC voltage (sometimes referred to as $V_{DC2}$), which is the same as the effective charging voltage in the DC charging signal 52 for charging the battery 50. In a non-limiting example, the DC-DC converter 88 may be a Buck-Boost DC-DC converter.

The relationship between the second DC voltage and the first DC voltage may be expressed as $V_{DC2}=D \times V_{DC1}$, wherein D (0≤D≤1) represents a duty-cycle of the DC-DC converter 88. As such, the second DC voltage can be increased or decreased by increasing or decreasing the duty-cycle of the DC-DC converter 88. As previously discussed in FIG. 3A, the effective charging power is influenced by the effective charging voltage and the effective charging current associated with the DC charging signal 52. As such, when the effective charging current is held steady, increasing or decreasing the second DC voltage will lead to an increase or decrease of the effective charging voltage provided to the battery 50.

In this regard, when the wireless charging controller 54 (not shown) determines that the effective charging power is greater than the target charging power, the wireless charging controller 54 may provide the second power decrease control signal 68 to the DC-DC converter 88 in addition to sending the BCSI 44(X) to the wireless charging station 30. The second power decrease control signal 68 decreases the duty-cycle of the DC-DC converter 88, thus reducing the second DC voltage and, consequently, the effective charging power.

In contrast, if the wireless charging controller 54 determines that the effective charging power is less than the target charging power, the wireless charging controller 54 may provide the second power increase control signal 70 to the DC-DC converter 88 in addition to sending the BCSI 44(X) to the wireless charging station 30. The second power increase control signal 70 increases the duty-cycle of the DC-DC converter 88, thus increasing the second DC voltage and, consequently, the effective charging power.

Hence, it is possible to adjust the effective charging power provided to the battery 50 by adjusting at least one of the load-line impedance in the impedance transformation circuitry 90 and the DC charging signal 52, which is determined by the duty-cycle of the DC-DC converter 88. Such adjustments may be carried out with or without sending the BCSI 44(X) to the wireless charging station 30.

To summarize the mechanisms of controlling the effective charging power that are discussed above in FIGS. 2, 3A, and 4, FIGS. 5 and 6 are provided. Common elements between FIGS. 2, 3A, 4, 5, and 6 are shown therein with common element numbers and thus, will not be re-described herein.

Figure 5:
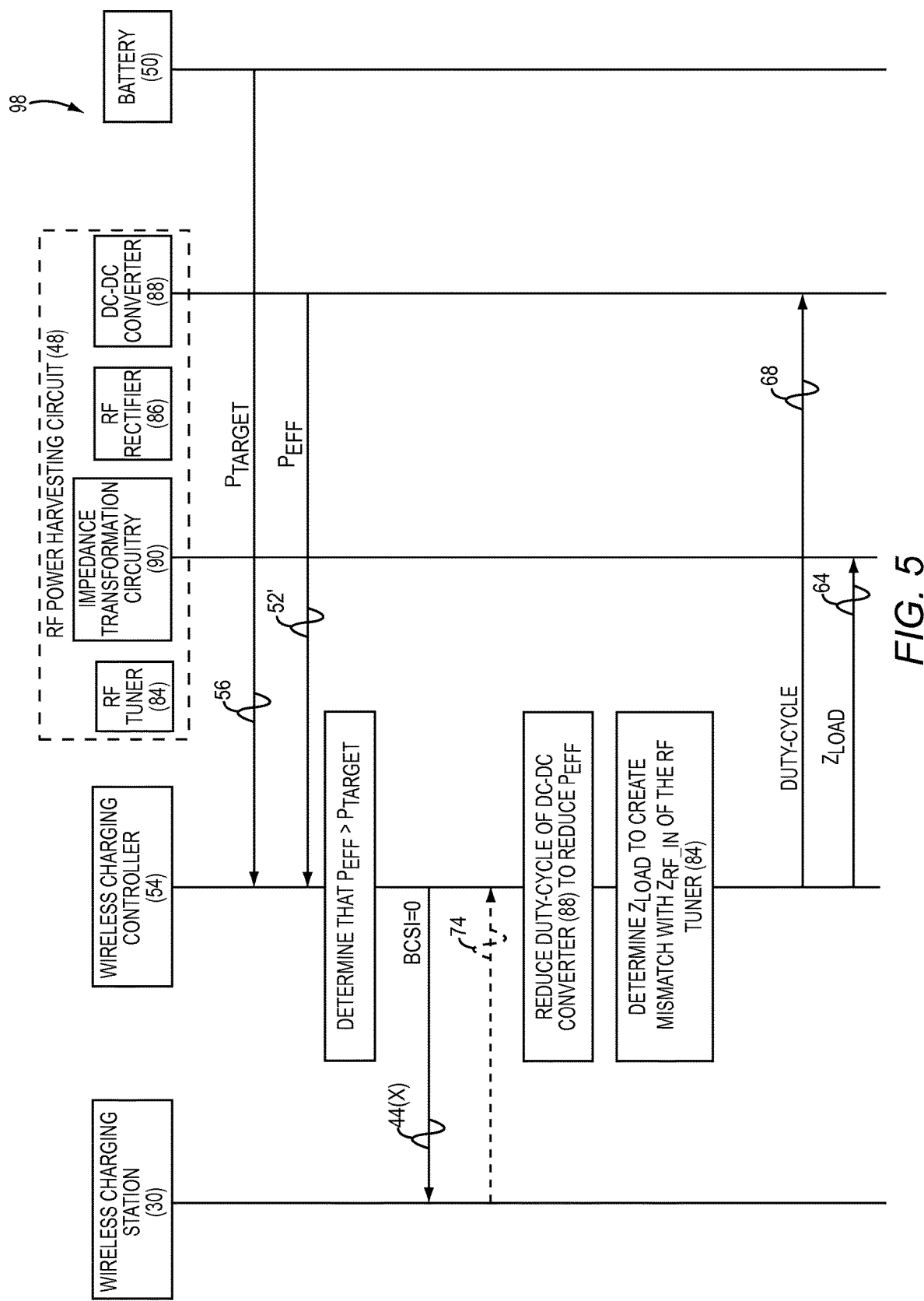
FIG. 5 illustrates an exemplary charging power reduction signal flow diagram for reducing the effective charging power of FIG. 3A when the effective charging power exceeds a target charging power required by the battery.

FIG. 5 illustrates an exemplary charging power reduction signal flow diagram 98 for reducing the effective charging power when the effective charging power exceeds the target charging power required by the battery 50.

The wireless charging controller 54 receives the battery status reading 56, which indicates the target charging power requested by the battery 50. The wireless charging controller 54 also receives the copy of the DC charging signal 52', which indicates the effective charging power provided to the battery 50. If the wireless charging controller 54 determines that the effective charging power is greater than the target charging power, the wireless charging controller 54 sends the BCSI 44(X), which is set to zero (0), to the wireless charging station 30 to request that the total RF power be reduced. In a non-limiting example, the wireless charging station 30 may provide the charging control signal 74 with instructions for adjusting the settings of the RF power harvesting circuit 48. Concurrent or subsequent to sending the BCSI 44(X), the wireless charging controller 54 is able to reduce the duty-cycle of the DC-DC converter 88 and/or adjust the load-line impedance of the impedance transformation circuitry 90 to reduce the effective charging power. The wireless charging controller 54 may determine the duty-cycle and/or the load-line impedance according to internal algorithms or based on the instructions received with the charging control signal 74. The wireless charging controller 54 then provides the first power decrease control signal 64 and the second power decrease control signal 68 to the impedance transformation circuitry 90 and the DC-DC converter 88 to adjust the load-line impedance and the duty-cycle, respectively.

Figure 6:
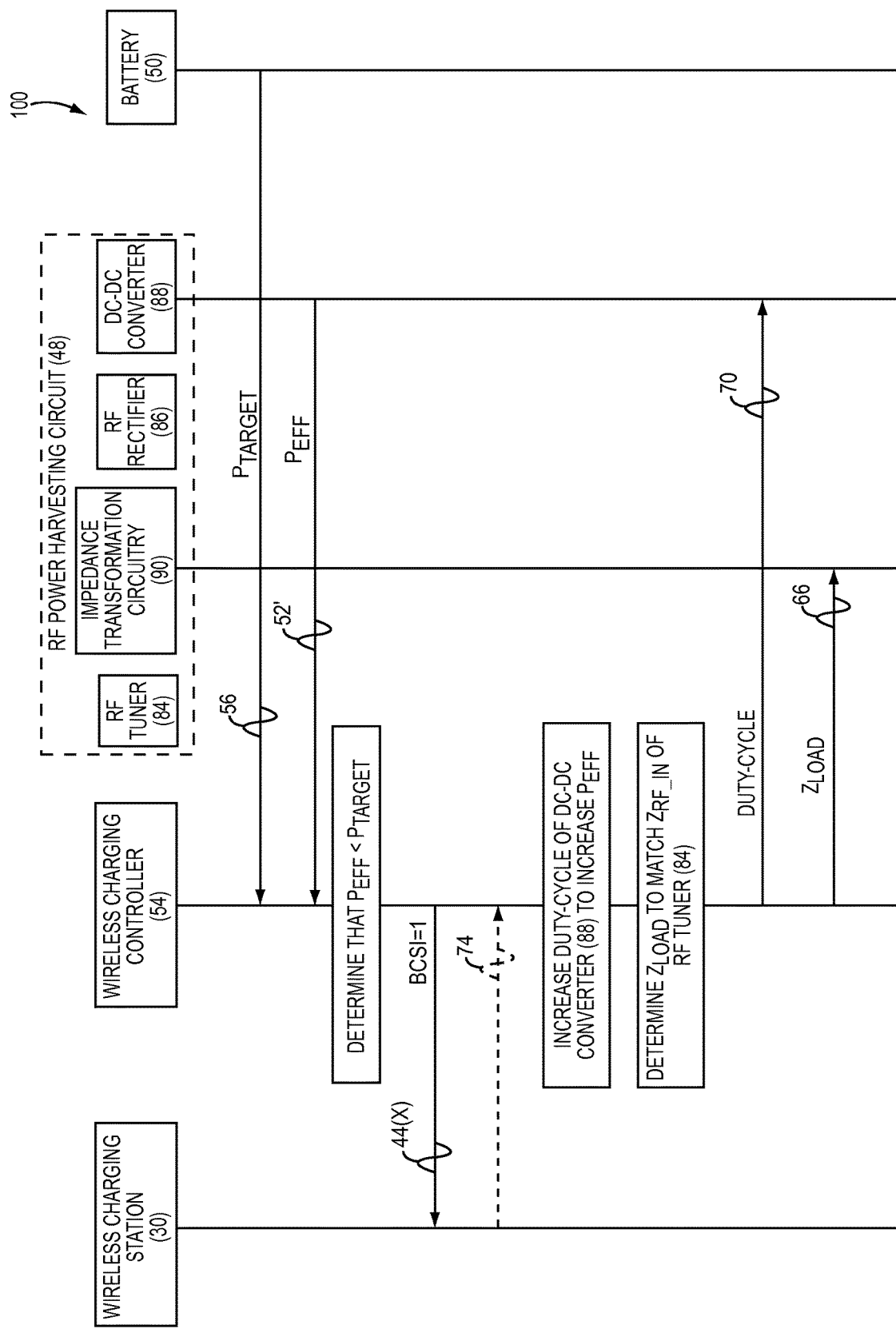
FIG. 6 illustrates an exemplary charging power increment signal flow diagram for increasing the effective charging power of FIG. 3A when the effective charging power falls short of the target charging power required by the battery.

FIG. 6 illustrates an exemplary charging power increment signal flow diagram 100 for increasing the effective charging power when the effective charging power falls short of the target charging power required by the battery 50.

The wireless charging controller 54 receives the battery status reading 56, which indicates the target charging power requested by the battery 50. The wireless charging controller 54 also receives the copy of the DC charging signal 52', which indicates the effective charging power provided to the battery 50. If the wireless charging controller 54 determines that the effective charging power is less than the target charging power, the wireless charging controller 54 sends the BCSI 44(X), which is set to one (1), to the wireless charging station 30 to request that the total RF power be increased. In a non-limiting example, the wireless charging station 30 may provide the charging control signal 74 with instructions for adjusting the settings of the RF power harvesting circuit 48. Concurrent or subsequent to sending the BCSI 44(X), the wireless charging controller 54 is able to increase the duty-cycle of the DC-DC converter 88 and/or adjust the load-line impedance of the impedance transformation circuitry 90 to increase the effective charging power. The wireless charging controller 54 may determine the duty-cycle and/or the load-line impedance according to internal algorithms or based on the instructions received from the charging control signal 74. The wireless charging controller 54 then provides the first power increase control signal 66 and the second power increase control signal 70 to the impedance transformation circuitry 90 and the DC-DC converter 88 to adjust the load-line impedance and the duty-cycle, respectively.

As discussed in FIGS. 5 and 6, the wireless charging controller 54 requests the wireless charging station 30 to decrease or increase the total RF power, and consequently the effective charging power, in the wireless RF charging signal 34(X) by setting the BCSI 44(X) to zero (0) or one (1). However, the wireless charging controller 54 is unable to provide precise indication in the BCSI 44(X) with regard to how much the wireless charging station 30 needs to decrease or increase the total RF power. As such, adjustment of the total RF power based on the BCSI 44(X) must be performed progressively by the wireless charging station 30 and the wireless charging controller 54.

Figure 7:
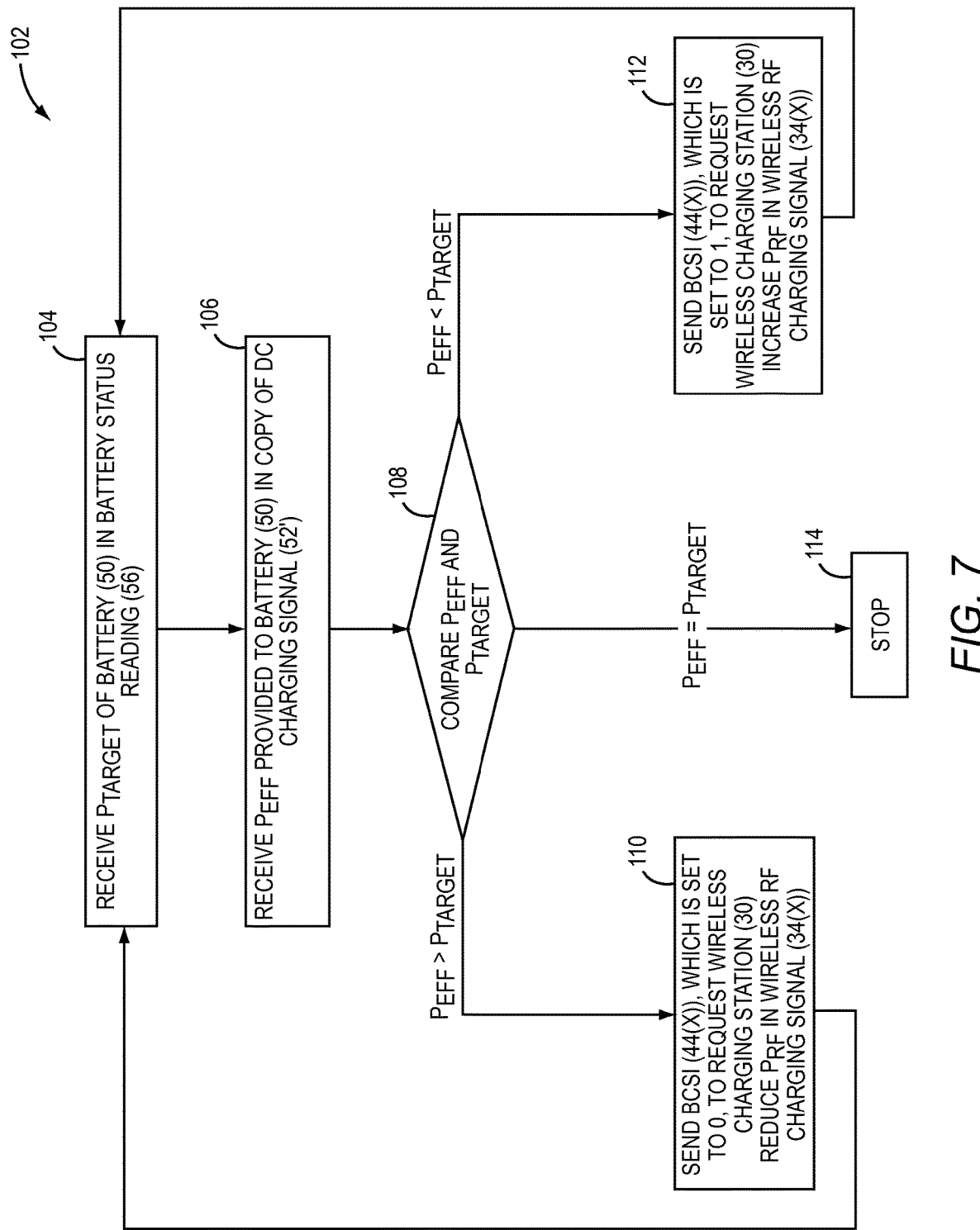
FIG. 7 is a flowchart of an exemplary RF power adjustment process employed by the wireless charging station of FIG. 2 and the wireless charging circuit of FIG. 3A for adjusting the effective charging power based on the BCSI.

In this regard, FIG. 7 is a flowchart of an exemplary RF power adjustment process 102 employed by the wireless charging station 30 and the wireless charging circuit 46(X) for adjusting the effective charging power based on the BCSI 44(X). Elements of FIG. 3A are referenced in connection with FIG. 7 and will not be re-described herein.

The wireless charging controller 54 (not shown) in the wireless charging circuit 46(X) (not shown) receives the target charging power requested by the battery 50 (not shown) in the battery status reading 56 (block 104). The wireless charging controller 54 also receives the effective charging power provided to the battery 50 in the copy of the DC charging signal 52' (block 106). The wireless charging controller 54 then compares the effective charging power and the target charging power (block 108). If the effective charging power is greater than the target charging power, the wireless charging controller 54 sends the BCSI 44(X), which is set to zero (0), to request the wireless charging station 30 to reduce the total RF power in the wireless RF charging signal 34(X) (block 110). If the effective charging power is less than the target charging power, the wireless charging controller 54 sends the BCSI 44(X), which is set to one (1), to request the wireless charging station 30 to increase the total RF power in the wireless RF charging signal 34(X) (block 112). In this regard, the wireless charging station 30 either decreases or increases the total RF power in response to receiving the BCSI 44(X). In a non-limiting example, the wireless charging station 30 may decide the amount of decrease or increase of the total RF power based on the total available power and how many of the one or more wireless stations 32(1)-32(N) are charged by the wireless charging station 30. The wireless charging controller 54, in the meantime, continues sending the BCSI 44(X), which is set to either zero (0) or one (1), until the effective charging power is equal to the target charging power (block 114).

Figure 8:
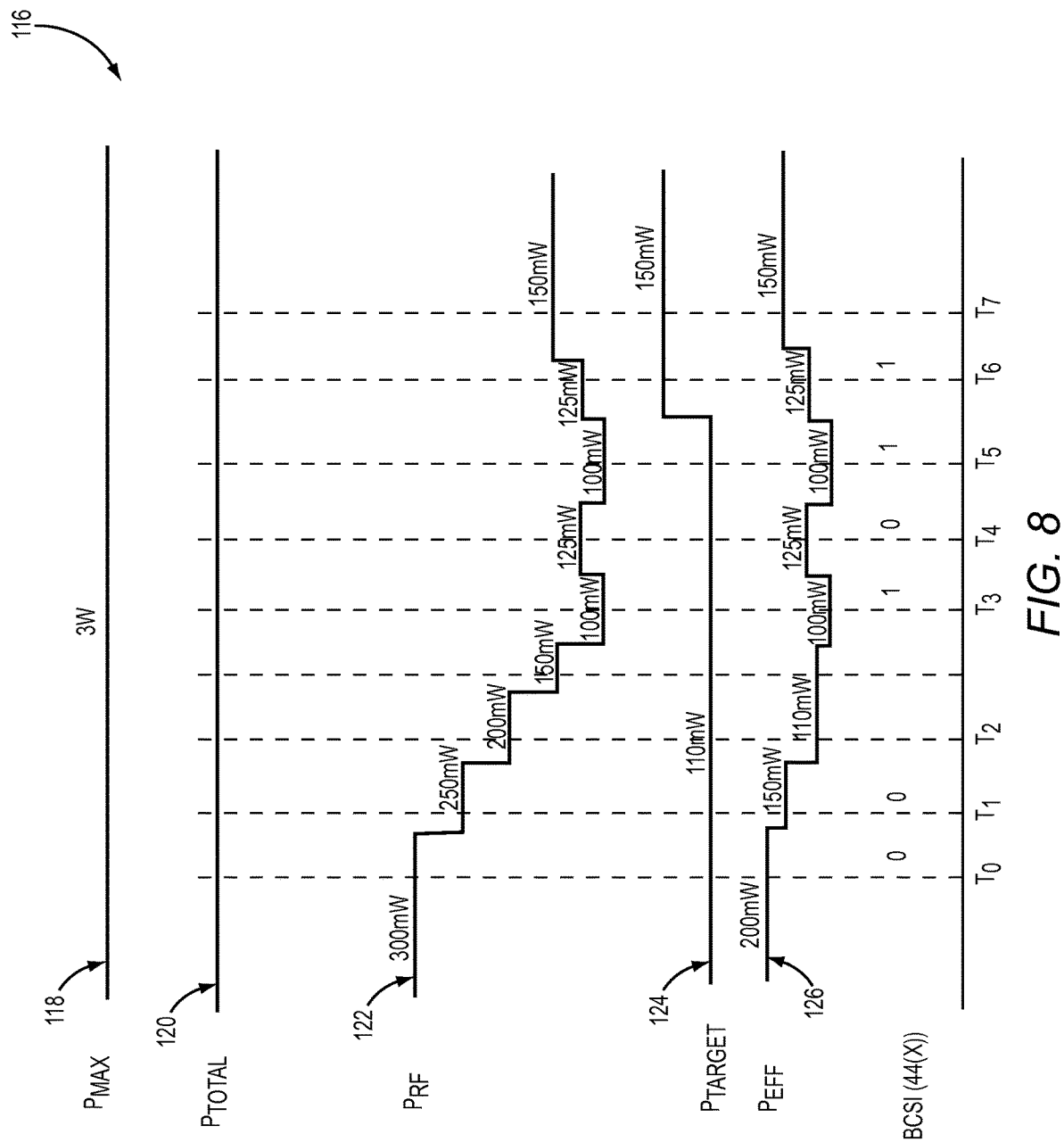
FIG. 8 is an exemplary power-versus-BCSI plot illustrating progressive adjustments to the effective charging power based on the BCSI.

FIG. 8 is an exemplary power-versus-BCSI plot 116 illustrating progressive adjustments to the effective charging power based on the BCSI 44(X). The power-versus-BCSI plot 116 comprises a maximum power (referenced in drawings as $P_{MAX}$) curve 118, a total available power curve 120, a total RF power curve 122, a target charging power curve 124, and an effective charging power curve 126. Exemplary power figures are cited herein for illustrative purposes and are not meant to be interpreted as limiting. Elements of FIGS. 2 and 3A are referenced in connection with FIG. 8 and will not be re-described herein.

According to the maximum power curve 118, the maximum power the wireless charging station 30 is allowed to transmit is three watts (3 W). The total available power, as shown in the total available power curve 120, is less than or equal to the maximum power and is shared by the one or more wireless stations 32(1)-32(N). The total RF power curve 122 illustrates fluctuations of the total RF power of the wireless RF charging signal 34(X). The fluctuations of the total RF power may be caused by sharing the total available power among the one or more wireless stations 32(1)-32(N), and/or power adjustments by the wireless charging station 30 in response to the BCSI 44(X).

At time $T_0$, the total RF power in the wireless RF charging signal 34(X) is three hundred milliwatts (300 mW). The target charging power requested by the battery 50 and the effective charging power provided to the battery 50 are one hundred and ten milliwatts (110 mW) and two hundred milliwatts (200 mW), respectively. Because the effective charging power is greater than the target charging power, the wireless charging circuit 46(X) sends the BCSI 44(X), which is set to zero (0), to request the wireless charging station 30 to reduce the effective charging power. In addition to sending the BCSI 44(X), the wireless charging circuit 46(X) may also reduce the effective charging power by adjusting the duty-cycle and/or the load-line impedance, as previously discussed in reference to FIG. 4.

At time $T_1$, the total RF power is reduced to two hundred and fifty milliwatts (250 mW). Accordingly, the effective charging power is reduced from 200 mW to one hundred and fifty milliwatts (150 mW). Since the effective charging power is still higher than the target charging power, the wireless charging circuit 46(X) resends the BCSI 44(X), which is set to zero (0), to request the wireless charging station 30 to further reduce the effective charging power.

At time $T_2$, the total RF power is reduced to 200 mW and the effective charging power is reduced from 150 mW to 110 mW. In this regard, the effective charging power is equal to the target charging power and the wireless charging circuit 46(X) will not send the BCSI 44(X) to the wireless charging station 30.

At time $T_3$, the total RF power drops to one hundred milliwatts (100 mW), which may be caused by the wireless charging station 30 sharing the total available power with more of the one or more wireless stations 32(1)-32(N). Consequently, the effective charging power drops to 100 mW and is less than the target charging power of 110 mW. As a result, the wireless charging circuit 46(X) sends the BCSI 44(X), which is set to one (1), to request the wireless charging station 30 to increase the effective charging power. In addition to sending the BCSI 44(X), the wireless charging circuit 46(X) may also increase the effective charging power by adjusting the duty-cycle and/or the load-line impedance, as previously discussed in reference to FIG. 4.

At time $T_4$, the total RF power and the effective charging power both rise to one hundred and twenty-five milliwatts (125 mW). Since the effective charging power is once again higher than the target charging power of 110 mW, the wireless charging circuit 46(X) again sends the BCSI 44(X), which is set to zero (0), to request the wireless charging station 30 to reduce the effective charging power.

At time $T_5$, the total RF power and the effective charging power both fall to 100 mW. Since the effective charging power is once again lower than the target charging power of 110 mW, the wireless charging circuit 46(X) sends the BCSI 44(X), which is set to one (1), to request the wireless charging station 30 to increase the effective charging power.

At time $T_6$, the total RF power and the effective charging power both increase to 125 mW. However, the target charging power also rises from 110 mW to 150 mW. As a result, the effective charging power remains lower than the target charging power. Consequently, the wireless charging circuit 46(X) sends the BCSI 44(X), which is set to one (1), to request the wireless charging station 30 to increase the effective charging power.

At time $T_7$, the total RF power, the effective charging power, and the target charging power are all at 150 mW. Therefore, there is no need to request the wireless charging station 30 to adjust the effective charging power.

Figure 9:
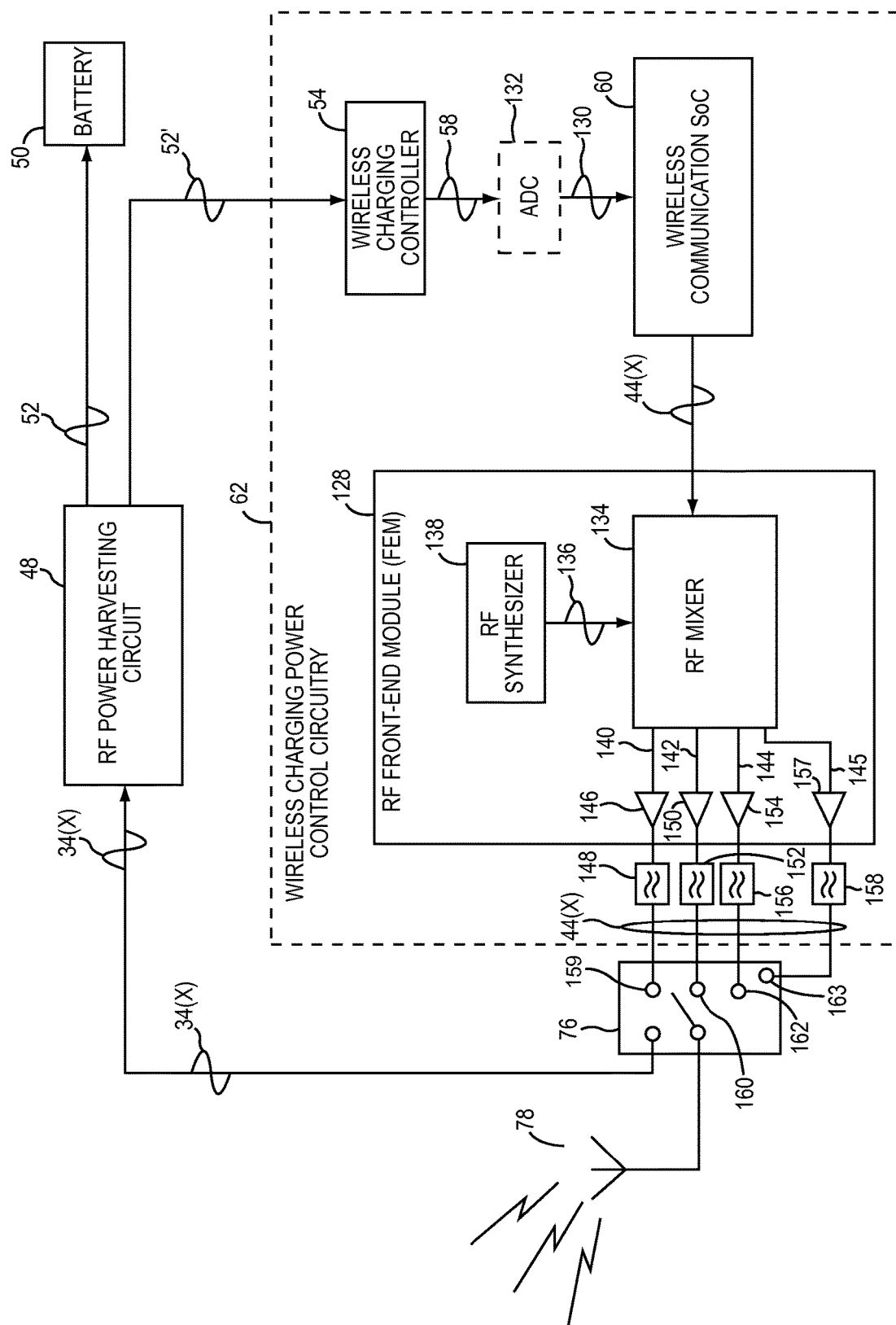
FIG. 9 is a schematic diagram of an exemplary RF front-end module (FEM) that is coupled to an antenna switch to transmit the BCSI of FIG. 3A on various RF spectrums of an industrial, scientific, and medical (ISM) band.

As previously discussed in FIG. 3A, the antenna switch 76 is coupled to the at least one antenna 78 that is capable of emitting RF signals on the 910 MHz, the 2400 MHz, the 5800 MHz, and the 24 GHz RF spectrums of the ISM band. In this regard, FIG. 9 is a schematic diagram of an exemplary RF front-end module (FEM) 128 that is coupled to the antenna switch 76 to transmit the BCSI 44(X) on various RF spectrums of the ISM band. Common elements between FIGS. 3A and 9 are shown therein with common element numbers, and thus will not be re-described herein.

With reference to FIG. 9, the BCSI feedback 58 is first converted into a digital BCSI feedback 130 by an analog-to-digital converter (ADC) 132 before being encoded by the wireless communication SoC 60 to generate the BCSI 44(X). The BCSI 44(X) is received by an RF mixer 134 and modulated onto one of the three RF spectrums, namely 910 MHz, 2400 MHz, 5800 MHz, and 24 GHz, of the ISM band. The RF mixer 134 modulates the BCSI 44(X) based on a modulation signal 136 that is provided by an RF synthesizer 138.

The RF FEM 128 comprises a first RF path 140, a second RF path 142, a third RF path 144, and a fourth path 145 that correspond to the 910 MHz, the 2400 MHz, the 5800 MHz, and the 24 GHz RF spectrum, respectively. The first RF path 140 comprises a first RF amplifier 146 and a first RF filter 148. The second RF path 142 comprises a second RF amplifier 150 and a second RF filter 152. The third RF path 144 comprises a third RF amplifier 154 and a third RF filter 156. The fourth RF path 145 comprises a fourth RF amplifier 157 and a fourth RF filter 158. The first RF path 140, the second RF path 142, and the third RF path 144 are coupled to a first coupling point 159, a second coupling point 160, a third coupling point 162, and a fourth coupling point 163 in the antenna switch 76, respectively.

When the BCSI 44(X) is modulated onto the 910 MHz RF spectrum, the antenna switch 76 couples the first RF path 140 to the at least one antenna 78 to transmit the BCSI 44(X) on the 910 MHz RF spectrum. When the BCSI 44(X) is modulated onto the 2400 MHz RF spectrum, the antenna switch 76 couples the second RF path 142 to the at least one antenna 78 to transmit the BCSI 44(X) on the 2400 MHz RF spectrum. When the BCSI 44(X) is modulated onto the 5800 MHz RF spectrum, the antenna switch 76 couples the third RF path 144 to the at least one antenna 78 to transmit the BCSI 44(X) on the 5800 MHz RF spectrum. When the BCSI 44(X) is modulated onto the 24 GHz RF spectrum, the antenna switch 76 couples the fourth RF path 145 to the at least one antenna 78 to transmit the BCSI 44(X) on the 24 GHz RF spectrum.

As previous discussed in FIG. 4, the RF rectifier 86 may be a single-stage rectifier or a differential single-stage rectifier. In this regard, FIG. 10A is a schematic diagram of an exemplary single-stage rectifier 164 that may be provided in the RF power harvesting circuit 48 of FIG. 4. Elements of FIG. 4 are referenced in connection with FIG. 10A and will not be re-described herein.

The single-stage rectifier 164 receives the AC charging signal 92 as an input. The AC charging signal 92 has a transferred RF power and a transferred voltage. In this regard, the transferred RF power and the transferred voltage are applied to the single-stage rectifier 164 as an input power (referenced in drawings as $P_{IN}$) and a forward voltage (referenced in drawings as $V_F$), respectively. The single-stage rectifier 164 comprises a resistor 166 and an inductor 168. The resistor 166 and the inductor 168 provide the load-line impedance.

The single-stage rectifier 164 comprises a first capacitor 170 and a second capacitor 172. The single-stage rectifier 164 also comprises a first diode 174 and a second diode 176. In a non-limiting example, the first diode 174 and the second diode 176 can be Schottky diodes. The first diode 174 and the second diode 176 receive a DC load current (referenced in drawings as $I_{DC\_LOAD}$) and a diode voltage (referenced in drawings as $V_{BE}$) associated with the DC load current. The first capacitor 170, the second capacitor 172, the first diode 174, and the second diode 176 are configured to convert an input current (referenced in drawings as $I_{IN}$), which is an AC, into the DC load current. The single-stage rectifier 164 generates the DC signal 94. The DC signal 94 has an output power (sometimes referred to as $P_{OUT}$) and is associated with the first DC voltage. The efficiency (h) of the single-stage rectifier 164 can be determined as $h = P_{OUT}/P_{IN} = 1/(1+(2V_{BE}/V_{DC1}))$.

FIG. 10B is a schematic diagram of an exemplary differential single-stage rectifier 178 that may be provided in the RF power harvesting circuit 48 of FIG. 4. Common elements between FIGS. 10A and 10B are shown therein with common element numbers and thus, will not be re-described herein.

The differential single-stage rectifier 178 comprises a first branch 180 and a second branch 182. Each of the first branch 180 and the second branch 182 can function individually as the single-stage rectifier 164 of FIG. 10A. A transformation switch 184 may be controlled by the first power decrease control signal 64 or the first power increase control signal 66 of FIG. 4 to adjust the load-line impedance of the differential single-stage rectifier 178. In this regard, when the transformation switch 184 is open, both the first branch 180 and the second branch 182 are coupled to the inductor 168, thus increasing the load-line impedance. When the transformation switch 184 is closed, the second branch 182 is short circuited. As a result, only the first branch 180 is coupled to the inductor 168 and the load-line impedance is reduced. According to previous discussion in FIG. 4, by adjusting the load-line impedance, it is possible to adjust the effective charging power provided to the battery 50 (not shown).

Those skilled in the art will recognize improvements and modifications to the embodiments of the present disclosure. All such improvements and modifications are considered within the scope of the concepts disclosed herein and the claims that follow.

What is claimed is:

1. A wireless charging circuit comprising:
   a radio frequency (RF) power harvesting circuit comprising:
      an RF tuner configured to receive a wireless RF charging signal from a wireless charging station and generate an alternating current (AC) charging signal, wherein the RF tuner comprises an input impedance;
      an RF rectifier configured to convert the AC charging signal to generate a direct current (DC) signal;
      impedance transformation circuitry provided between the RF tuner and the RF rectifier and configured to provide an adjustable load-line impedance; and
      a DC-to-DC (DC-DC) converter configured to generate a DC charging signal based on the DC signal received from the RF rectifier;
   an RF front-end module (FEM) comprising:
      a plurality of RF paths corresponding to a plurality of RF spectrums, respectively; and
      an antenna switch configured to couple the RF FEM to at least one antenna; and
   a wireless charging controller configured to:
      obtain a battery status reading from a battery;
      determine a target charging power required by the battery based on the battery status reading and a battery charging profile;

receive an indication signal from the RF power harvesting circuit indicative of an effective charging power in the DC charging signal;

compare the effective charging power in the DC charging signal against the determined target charging power required by the battery;

send a battery charging signal indication (BCSI) to the wireless charging station to reduce a total RF power associated with the wireless RF charging signal if the effective charging power is greater than the determined target charging power;

send the BCSI to the wireless charging station to increase the total RF power associated with the wireless RF charging signal if the effective charging power is less than the determined target charging power;

adjust at least one of the adjustable load-line impedance of the impedance transformation circuitry and a duty-cycle of the DC-DC converter to decrease the effective charging power in the DC charging signal if the effective charging power is greater than the determined target charging power of the battery; and adjust the at least one of the adjustable load-line impedance of the impedance transformation circuitry and the duty-cycle of the DC-DC converter to increase the effective charging power in the DC charging signal if the effective charging power is less than the determined target charging power of the battery;

wherein the BCSI is sent to the wireless charging station via the antenna switch configured to couple the at least one antenna to the RF power harvesting circuit and one of the plurality of RF paths.

2. The wireless charging circuit of claim 1 wherein the battery is a lithium-ion (Li-ion) battery and the wireless charging controller is configured to determine the target charging power based on a Li-ion battery charging profile.

3. The wireless charging circuit of claim 1 wherein the wireless charging controller is further configured to control the at least one of the adjustable load-line impedance and the DC charging signal based on instructions received from the wireless charging station.

4. The wireless charging circuit of claim 1 wherein the wireless RF charging signal is a beamformed wireless RF charging signal.

5. The wireless charging circuit of claim 1 wherein the RF power harvesting circuit receives the wireless RF charging signal on an industrial, scientific, and medical (ISM) band.

6. The wireless charging circuit of claim 1 provided in a battery-operated electronic device selected from the group consisting of: a smartphone; a smartwatch; a tablet; a personal computer; a digital camera; a portable music player; a portable video player; a portable game player; and a video recorder.

7. The wireless charging circuit of claim 1 further comprising a wireless communication system-on-chip (SoC) configured to encode the BCSI for transmission to the wireless charging station.

8. The wireless charging circuit of claim 7 wherein the wireless communication SoC is further configured to encode a received signal strength indicator (RSSI) corresponding to the wireless RF charging signal for transmission to the wireless charging station.

9. The wireless charging circuit of claim 7 wherein the wireless communication SoC comprises the wireless charging controller.

10. The wireless charging circuit of claim 7 wherein the wireless communication SoC is a SoC selected from the group consisting of: a BLUETOOTH SoC; a wireless-fidelity (Wi-Fi) SoC; a ZigBee SoC; and a BLUETOOTH Low-Energy (BLE) SoC.

11. The wireless charging circuit of claim 7 wherein the plurality of RF paths comprises:
a first RF path corresponding to a nine hundred ten megahertz (910 MHz) RF spectrum;
a second RF path corresponding to a twenty-four hundred megahertz (2400 MHz) RF spectrum;
a third RF path corresponding to a fifty-eight hundred megahertz (5800 MHz) RF spectrum; and
a fourth RF path corresponding to a twenty-four gigahertz (24 GHz) RF spectrum.

12. The wireless charging circuit of claim 11 wherein the antenna switch is configured to couple the RF power harvesting circuit to the at least one antenna to receive the wireless RF charging signal.

13. The wireless charging circuit of claim 11 wherein the RF FEM further comprises an RF mixer configured to modulate the BCSI to an RF spectrum corresponding to one of the first RF path, the second RF path, the third RF path and the fourth RF path.

14. The wireless charging circuit of claim 13 wherein the antenna switch is configured to:
couple the at least one antenna to the first RF path if the BCSI is modulated to the 910 MHz RF spectrum;
couple the at least one antenna to the second RF path if the BCSI is modulated to the 2400 MHz RF spectrum;
couple the at least one antenna to the third RF path if the BCSI is modulated to the 5800 MHz RF spectrum; and
couple the at least one antenna to the fourth RF path if the BCSI is modulated to the 24 GHz RF spectrum.

15. The wireless charging circuit of claim 11 wherein the at least one antenna comprises:
a communication antenna configured to transmit the BCSI to the wireless charging station; and
a wireless charging antenna configured to receive the wireless RF charging signal from the wireless charging station.

16. The wireless charging circuit of claim 15 wherein the RF power harvesting circuit is coupled to the wireless charging antenna to receive the wireless RF charging signal.

* * * * *